(12) United States Patent
Choi et al.

(10) Patent No.: US 12,222,476 B2
(45) Date of Patent: Feb. 11, 2025

(54) IMAGING DEVICE

(71) Applicant: SAMSUNG ELECTRONICS CO., LTD., Suwon-si (KR)

(72) Inventors: Kyuhwan Choi, Yongin-si (KR); Dong Kyung Nam, Yongin-si (KR); Kiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/342,938

(22) Filed: Jun. 28, 2023

(65) Prior Publication Data

US 2023/0341665 A1  Oct. 26, 2023

Related U.S. Application Data

(63) Continuation of application No. 17/203,247, filed on Mar. 16, 2021, now Pat. No. 11,726,306.

(30) Foreign Application Priority Data

Oct. 22, 2020 (KR) .................. 10-2020-0137748

(51) Int. Cl.
| | | |
|---|---|---|
| G02B 15/00 | (2006.01) | |
| G02B 3/14 | (2006.01) | |
| G02B 26/00 | (2006.01) | |
| H04N 23/51 | (2023.01) | |
| H04N 23/69 | (2023.01) | |
| H04N 23/951 | (2023.01) | |

(52) U.S. Cl.
CPC ............ G02B 15/00 (2013.01); G02B 3/14 (2013.01); G02B 26/005 (2013.01); H04N 23/69 (2023.01); H04N 23/951 (2023.01); H04N 23/51 (2023.01)

(58) Field of Classification Search
CPC .... G02B 15/00; G02B 26/004; G02B 26/005; G02B 27/0075; G02B 3/0062; G02B 3/14; H04N 23/51; H04N 23/69; H04N 23/951; H04N 23/957
See application file for complete search history.

(56) References Cited

U.S. PATENT DOCUMENTS

| | | |
|---|---|---|
| 6,977,777 B1 | 12/2005 | Wick |
| 7,009,652 B1 | 3/2006 | Tanida et al. |
| 7,412,107 B2 | 8/2008 | Milanfar et al. |
| 7,724,439 B2 | 5/2010 | Li et al. |
| 7,940,282 B2 | 5/2011 | Milanfar et al. |

(Continued)

FOREIGN PATENT DOCUMENTS

| | | |
|---|---|---|
| CN | 104539832 A | 4/2015 |
| JP | 2006-251613 A | 9/2006 |

(Continued)

OTHER PUBLICATIONS

Communication dated Feb. 8, 2022 issued by the European Patent Office in counterpart European Application No. 21189955.4.

(Continued)

*Primary Examiner* — Amy R Hsu
(74) *Attorney, Agent, or Firm* — Sughrue Mion, PLLC

(57) ABSTRACT

An imaging device may generate a zoom image corresponding to a plurality of magnifications by adjusting an effective focal length through a multi-layer optical system including an active imaging array having an active imaging lens.

20 Claims, 19 Drawing Sheets

(56) References Cited

U.S. PATENT DOCUMENTS

| | | |
|---|---|---|
| 8,237,841 B2 | 8/2012 | Tanida et al. |
| 8,400,555 B1 | 3/2013 | Georgiev et al. |
| 9,201,175 B2 | 12/2015 | Jannard et al. |
| 9,316,810 B2 | 4/2016 | Mercado |
| 9,392,188 B2 | 7/2016 | Shabtay et al. |
| 9,485,397 B2 | 11/2016 | Rudmann et al. |
| 9,557,627 B2 | 1/2017 | Mercado |
| 10,379,324 B2 | 8/2019 | Jungwirth et al. |
| 11,262,487 B1* | 3/2022 | Burgess ................ G06F 1/1609 |
| 11,546,574 B2* | 1/2023 | Arieli .................... G02B 30/24 |
| 2004/0012710 A1 | 1/2004 | Yaji et al. |
| 2015/0036224 A1 | 2/2015 | Jungwirth et al. |
| 2015/0124311 A1 | 5/2015 | Berge et al. |
| 2015/0253647 A1 | 9/2015 | Mercado |
| 2016/0241840 A1* | 8/2016 | Kim ..................... H04N 13/232 |
| 2017/0039960 A1 | 2/2017 | Jepsen |
| 2017/0078568 A1 | 3/2017 | Venkataraman et al. |
| 2017/0111558 A1 | 4/2017 | Brueckner et al. |
| 2017/0139213 A1* | 5/2017 | Schmidtlin ........ G02B 27/0176 |
| 2018/0152692 A1 | 5/2018 | Cho et al. |
| 2020/0112671 A1 | 4/2020 | Kang et al. |
| 2020/0345230 A1* | 11/2020 | Thurin .................. A61B 3/145 |
| 2021/0208387 A1 | 7/2021 | Karam |
| 2021/0231966 A1 | 7/2021 | Karam et al. |

FOREIGN PATENT DOCUMENTS

| | | |
|---|---|---|
| JP | 2016-192616 A | 11/2016 |
| KR | 10-1205519 B1 | 12/2012 |
| KR | 10-2014-0140495 A | 12/2014 |
| KR | 10-2016-0065742 A | 6/2016 |
| KR | 10-2016-0101539 A | 8/2016 |
| KR | 10-1876529 B1 | 7/2018 |
| KR | 10-2019-0053074 A | 5/2019 |
| KR | 10-2019-0060441 A | 6/2019 |
| KR | 10-2020-0054410 A | 5/2020 |
| KR | 10-2021-0051242 A | 5/2021 |
| KR | 10-2021-0081767 A | 7/2021 |

OTHER PUBLICATIONS

R. Hamilton Shepard, "Towards an Optimized Gabor Superlens", International Optical Design Conference 2014, IEEE, Proceedings of SPIE, vol. 9293, doi: 10.1117/12.2073294, Dec. 2014, 11 pages total, XP060044708.

Non-Final Office Action issued in parent U.S. Appl. No. 17/203,247 mailed Sep. 15, 2022.

Notice of Allowance issued in parent U.S. Appl. No. 17/203,247 mailed Mar. 29, 2023.

* cited by examiner

IMAGING DEVICE

CROSS-REFERENCE TO RELATED APPLICATION

This application is a continuation of U.S. application Ser. No. 17/203,247 filed on Mar. 16, 2021, which is based on and claims priority from Korean Patent Application No. 10-2020-0137748, filed on Oct. 22, 2020 in the Korean Intellectual Property Office, the disclosures of which are incorporated herein by reference in their entirety.

BACKGROUND

1. Field

Methods and apparatuses consistent with example embodiments relate to an imaging device.

2. Description of the Related Art

With recent developments of optical technology and image processing technology, an imaging device is widely utilized in various fields such as multimedia contents, security, and recognition. For example, the imaging device may be provided in a mobile device, a camera, a vehicle, and a computer to capture an image, recognize an object, or acquire data for controlling the device. A size of the imaging device may be determined based on a size of a lens, a focal length of a lens, and a size of a sensor. Moreover, when the size of the lens decreases, the focal length of the lens may also decrease. To reduce the size of the imaging device, a multi-lens including small lenses may be used.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an example embodiment, there is provided an imaging device comprising: a plurality of imaging lens arrays comprising a plurality of imaging optical lenses; and a sensing array comprising a plurality of sensing elements configured to sense light passing through the plurality of imaging lens arrays, wherein at least one imaging lens array among the plurality of imaging lens arrays comprises an active imaging lens with a variable focal length.

The focal length of the active imaging lens is adjustable by changing at least one of a thickness or a sagittal value of the active imaging lens.

The active imaging lens comprises an active wet lens comprising a polar liquid and an apolar liquid in a space between a plurality of electrodes, and at least one of the sagittal value or the thickness of the active wet lens is changeable based on a voltage applied to the plurality of electrodes.

An effective focal length of the plurality of imaging lens arrays is adjustable based on a selected target magnification.

An effective focal length of the plurality of imaging lens arrays is identified based on focal lengths of imaging optical lenses included in the plurality of imaging lens arrays and distances between the plurality of imaging lens arrays.

The focal length of the active imaging lens is adjustable based on an effective focal length corresponding to a selected target magnification.

The imaging may further comprise: a memory configured to store focal length-related information corresponding to a plurality of previously defined magnifications for each of the plurality of imaging lens arrays, wherein a focal length of the active imaging lens is adjustable based on the stored focal length-related information.

All lenses of an imaging lens array, among the plurality of imaging lens arrays, comprising the active imaging lens are deformable to have a same focal length.

Among the plurality of imaging lens arrays, a first imaging lens array comprises a positive lens and a second imaging lens array comprises a negative lens.

All imaging lenses included in the first imaging lens array are positive lenses, and all imaging lenses included in the second imaging lens array are negative lenses.

A number of arrays of the plurality of imaging lens arrays is three or more.

Another imaging lens array among the plurality of imaging lens arrays comprises a passive imaging lens having a fixed focal length.

A distances between the plurality of imaging lens arrays on an optical axis is fixed.

A distance between the sensing array and an imaging lens array that is most adjacent to the sensing array among the plurality of imaging lens arrays on an optical axis is fixed.

The imaging may further comprise: a processor configured to acquire, based on sensing information sensed by the sensing elements sensing light passing through each of the plurality of imaging optical lenses in the sensing array, images of a first resolution individually corresponding to the plurality of imaging optical lenses and reconstruct an image of a second resolution higher than the first resolution.

Each of the plurality of imaging optical lenses is configured to focus the light to non-integer sensing elements.

When a field of view by the plurality of imaging lens arrays exceeds a super-wide threshold angle, a principal plane formed by the plurality of imaging lens arrays is located between the sensing array and an imaging lens array that is most adjacent to the sensing array among the plurality of imaging lens arrays.

Wherein an optical system in which the plurality of imaging lens arrays is combined provides a variable zoom magnification range between 0.5 times and 110 times, inclusive.

All imaging lenses of an imaging lens array comprising the active imaging lens are active imaging lenses.

According to another example embodiment, there is provided an electronic terminal comprising: a plurality of imaging lens arrays provided in a housing of the electronic terminal and comprising a plurality of imaging optical lenses; a sensing array comprising a plurality of sensing elements configured to sense light passing through the plurality of imaging lens arrays; and a processor configured to generate an image corresponding to a target magnification based on the sensed light, wherein at least one imaging lens array among the plurality of imaging lens arrays comprises an active imaging lens with a variable focal length.

According to another example embodiment, there is provided an imaging device comprising: at least one first imaging lens array, each comprising a plurality of imaging optical lenses, each having an adjustable focal length; at least one second imaging lens array, each comprising a plurality of imaging optical lenses, each having a non-adjustable focal length; and a sensing array comprising a plurality of sensing elements configured to sense light passing through the plurality of imaging lens arrays.

According to another example embodiment, there is provided an imaging device comprising: a memory storing one or more instruction; and a processor executing the one or more instructions to: output a control signal to adjust a focal length each of a plurality of active imaging lenses in a imaging device by changing at least one of a thickness or a sagittal value of each of the plurality of active imaging lenses; acquire a plurality of images of a first resolution based on the adjusted focal length of the plurality of active imaging lenses; and generate an image of a second resolution higher than the first resolution.

According to another example embodiment, there is provided an image capturing method comprising: adjusting a focal length each of a plurality of active imaging lenses in a imaging device by changing at least one of a thickness or a sagittal value of each of the plurality of active imaging lenses; acquiring a plurality of images of a first resolution based on the adjusted focal length of the plurality of active imaging lenses; and generating an image of a second resolution higher than the first resolution.

BRIEF DESCRIPTION OF DRAWINGS

The above and/or other aspects will be more apparent by describing certain example embodiments with reference to the accompanying drawings, in which.

DETAILED DESCRIPTION

Figure 1A:
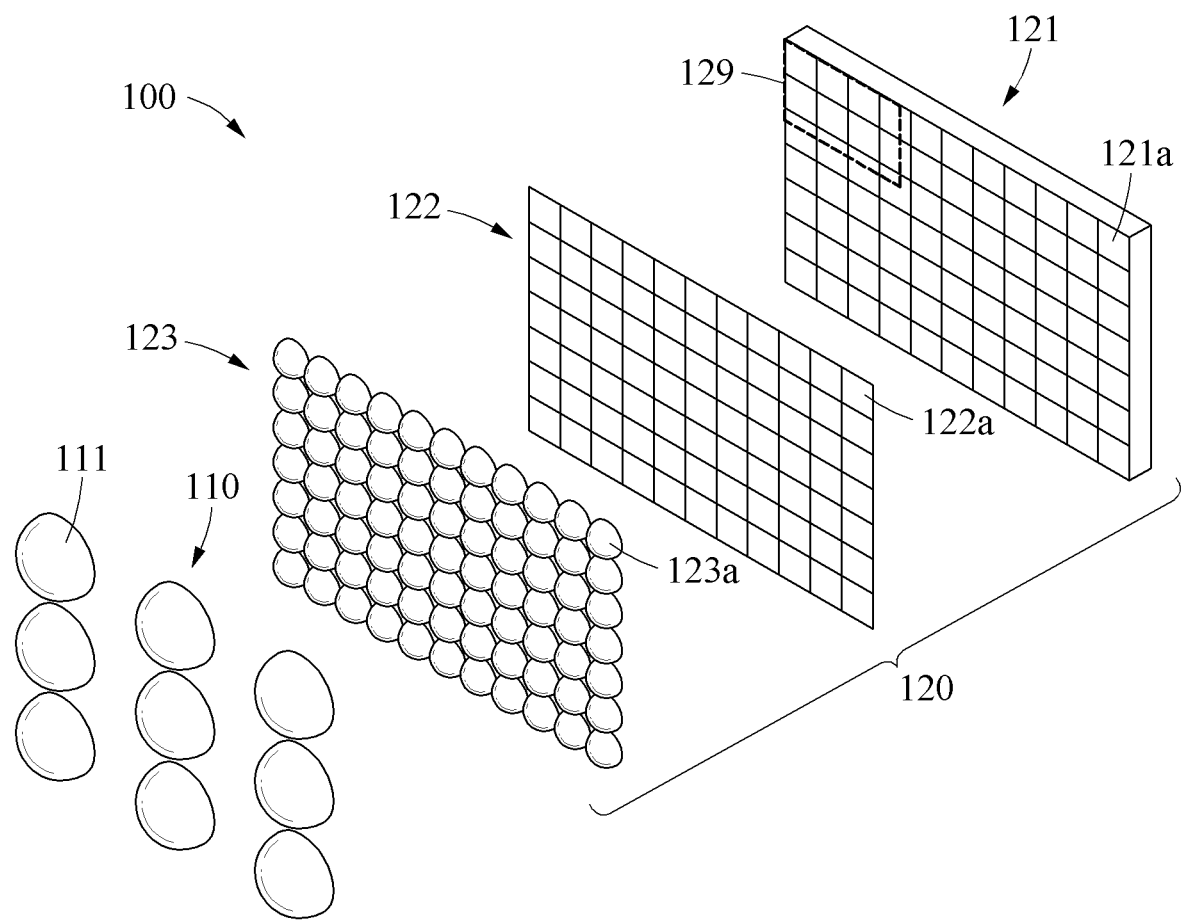
FIGS. 1A and 1B illustrate a configuration of an imaging device according to an example embodiment.

The following structural or functional descriptions are example to merely describe the example embodiments, and the scope of the example embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, reference will now be made in detail to example embodiments, examples of which are illustrated in the accompanying drawings, wherein like reference numerals refer to the like elements throughout. Example embodiments are described below in order to explain the present disclosure by referring to the figures.

Figure 1B:
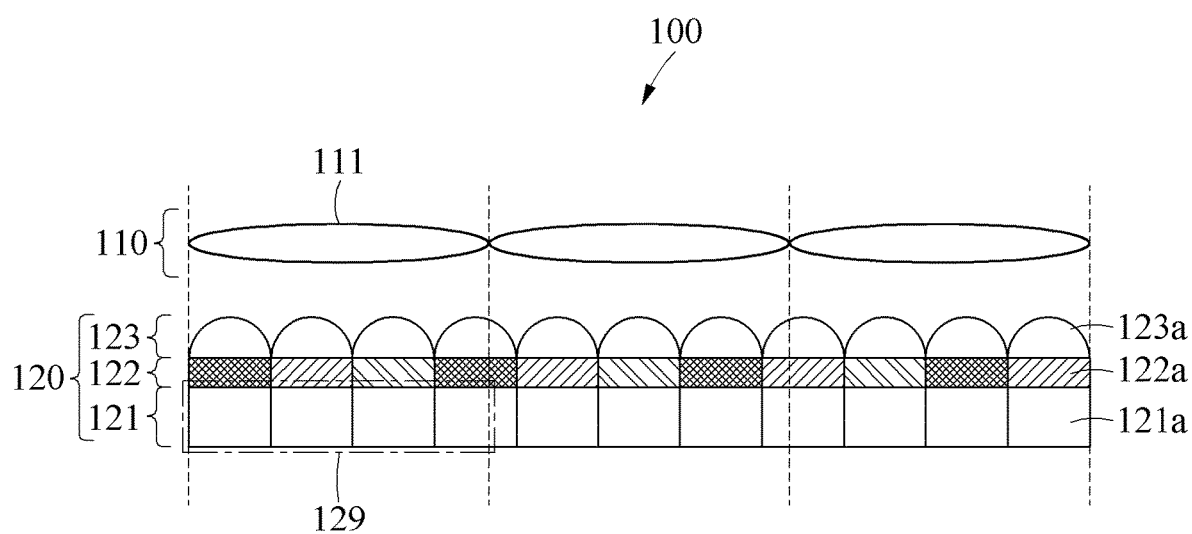

FIGS. 1A and 1B illustrate a configuration of an imaging device according to an example embodiment. FIG. 1A is a perspective view of the imaging device, and FIG. 1B is a cross-sectional view of the imaging device.

An imaging device 100 includes a lens array 110 and an image sensor 120. The lens array 110 may include lens elements 111, and the image sensor 120 may include sensing elements 121a. The lens elements 111 may be arranged along a plane of the lens array 110. The sensing elements 121a may be arranged along a plane of a sensing array 121 in the image sensor 120. The plane of the lens array 110 may be placed parallel to the plane of the sensing array 121. The lens array 110 may be a multi-lens array (MLA) for imaging, and may also be referred to as an "imaging lens array."

The image sensor 120 may include the sensing array 121, an optical filter 122, and a condensing lens array 123. However, the disclosure is not limited thereto, and as such, according to another example embodiment, instead of the optical filter 122, an individual condensing micro-lens 123a of the condensing lens array 123 may have an optical characteristic that passes a predetermined wavelength band and blocks remaining wavelength bands.

The condensing lens array 123 may include a plurality of condensing micro-lenses 123a for concentrating light passing through the lens array 110 onto the sensing array 121. For example, the condensing lens array 123 may include the same number of condensing micro-lenses 123a as the number of sensing elements included in the sensing array 121.

The plurality of condensing micro-lenses 123a may be arranged between an imaging optical lens and the sensing array 121 to concentrate light passing through the imaging optical lens and transmit the concentrated light to a sensing element 121a corresponding to the condensing micro-lens 123a. For example, as illustrated in FIG. 1B, the condensing micro-lens 123a may be disposed on the sensing element 121a of the sensing array 121 to concentrate the light onto the sensing element 121a located therebelow. In addition, as illustrated in FIG. 1B, a color filter 122a may be disposed between the condensing micro-lens 123a and the sensing element 121a.

The optical filter 122 may be a filter having an optical characteristic that passes a specific wavelength band and blocks remaining wavelength bands. The specific wavelength may be a predetermined wavelength. For example, the optical filter 122 may be implemented as a color filter array (CFA) including a plurality of color filters arranged along a filter plane. The color filter 122a may be a filter that passes light of a wavelength band corresponding to a specific color and blocks light of remaining bands. The specific color may be a predetermined color. For example, the color filter 122a may include a red-pass filter, a green-pass filter, and a blue-pass filter. The red-pass filter may pass light of a wavelength band corresponding to red color and blocks light of remaining bands. The green-pass filter may pass light of a wavelength band corresponding to green color and blocks light of remaining bands. The blue-pass filter may pass light of a wavelength band corresponding to blue color and blocks light of remaining bands. In the color filter array, color filters individually passing color light may be arranged in a Bayer pattern or other patterns along a filter plane. The optical filter 122 may also be an infrared cut filter that passes a visible ray band and blocks an infrared ray band.

According to an example embodiment, the image sensor 120 may generate an image based on the light incident on the sensing elements 121a. According to an example embodiment, a quality of an image captured and generated by the image sensor 120 may be determined based on the number of sensing elements included in the sensing array 121 and an amount of light incident on the sensing element 121a. For example, a resolution of the image may be determined based on the number of sensing elements included in the sensing array 121. Also, a sensitivity of the image may be determined based on the amount of light incident on the sensing element 121a. The amount of light incident on the sensing element 121a may be determined based on a size of the sensing element 121a. As the size of the sensing element 121a increases, the amount of incident light may increase, which may increase a dynamic range of the sensing array 121. Accordingly, as the number of sensing elements included in the sensing array 121 increases, a resolution of an image acquired by the image sensor 120 may increase. Also, as the size of the sensing element 121a increases, the image sensor 120 may operate more advantageously for capturing a high-sensitivity image at a low illumination.

An individual lens element 111 of the lens array 110 may cover a predetermined sensing area 129 of the sensing array 121 corresponding to its lens size. The sensing area 129 covered by the lens element 111 in the sensing array 121 may be determined based on the lens size of the lens element 111. The sensing area 129 may indicate an area on the sensing array 121, where rays of a predetermined field of view (FOV) range reach after passing through the corresponding lens element 111. A size of the sensing area 129 may be expressed by a distance or a diagonal length from a center of the sensing area 129 to an outermost point. In other words, light passing through the individual lens element 111 may be incident onto the sensing elements of the sensing array 121 included in the sensing area 129.

Each of the sensing elements of the sensing array 121 may generate sensing information based on the rays passing through lenses of the lens array 110. For example, the sensing element 121a may sense a value of an intensity of the light received through the lens element 111 as sensing information. The imaging device 100 may determine intensity information corresponding to an original signal related to points included in a field of view of the imaging device 100 based on the sensing information output by the sensing array 121 and restore a captured image based on the determined intensity information. For example, the individual sensing element 121a of the sensing array 121 may be an optical sensing element including a complementary metal-oxide-semiconductor (CMOS), a charge-coupled device (CCD), a photodiode, and the like.

In addition, the sensing element 121a may generate a color intensity value corresponding to a desired color as sensing information by sensing the light passing through the color filter 122a. Each of the plurality of sensing elements included in the sensing array 121 may be disposed to sense a color different from that sensed by a neighboring sensing element disposed spatially adjacent thereto.

When a diversity of sensing information is sufficiently secured and a full rank relationship is formed between the sensing information and original signal information corresponding to the points included in the field of view of the imaging device 100, a captured image corresponding to a maximum resolution of the sensing array 121 may be acquired. The diversity of the sensing information may be secured based on parameters of the imaging device 100 such as the number of lenses included in the lens array 110 and the number of sensing elements included in the sensing array 121.

In the structure of the multi-lens array for imaging, the imaging optical lens and the sensing array 121 may be arranged based on a fractional alignment structure. For example, the fractional alignment structure may represent a structure in which the sensing area 129 covered by the individual lens element 111 includes a non-integer number of sensing elements.

When the lens elements included in the lens array 110 has the same lens size, the number of lens elements included in the lens array 110 and the number of sensing elements included in the sensing array 121 may be in a relatively prime relationship. A ratio P/L between a number L of lens elements corresponding to one axis of the lens array 110 and a number P of sensing elements corresponding to one axis of the sensing array 121 may be determined to be a real number. Each of the lens elements may cover the same number of sensing elements as pixel offsets corresponding to P/L. For example, the sensing area 129 of FIG. 1A may include 2.3 (=7/3) sensing elements along a vertical axis and 3.67 (=11/3) sensing elements along a horizontal axis. Further, the lens element 111 may cover a plurality of non-integer condensing micro-lenses. In other words, each of the plurality of imaging optical lenses may transfer light received from outside to non-integer sensing elements. Accordingly, in the image sensor 120, the number of condensing micro-lenses may be the same as the number of sensing elements of the sensing array 121. Also, the number of lens elements (e.g., imaging optical lenses) of the lens array 110 may be less than the number of condensing micro-lenses.

In the fractional alignment structure of the imaging device 100 as described above, an optical center axis (OCA) of each lens element 111 may be arranged to be slightly different with respect to the sensing array 121. In other words, the lens element 111 may be disposed to be eccentric to the sensing element 121a. Accordingly, each lens element 111 of the lens array 110 may receive different light field information. The light field information received by the fractional alignment structure is described in greater detail with reference to FIG. 2.

Figure 2:
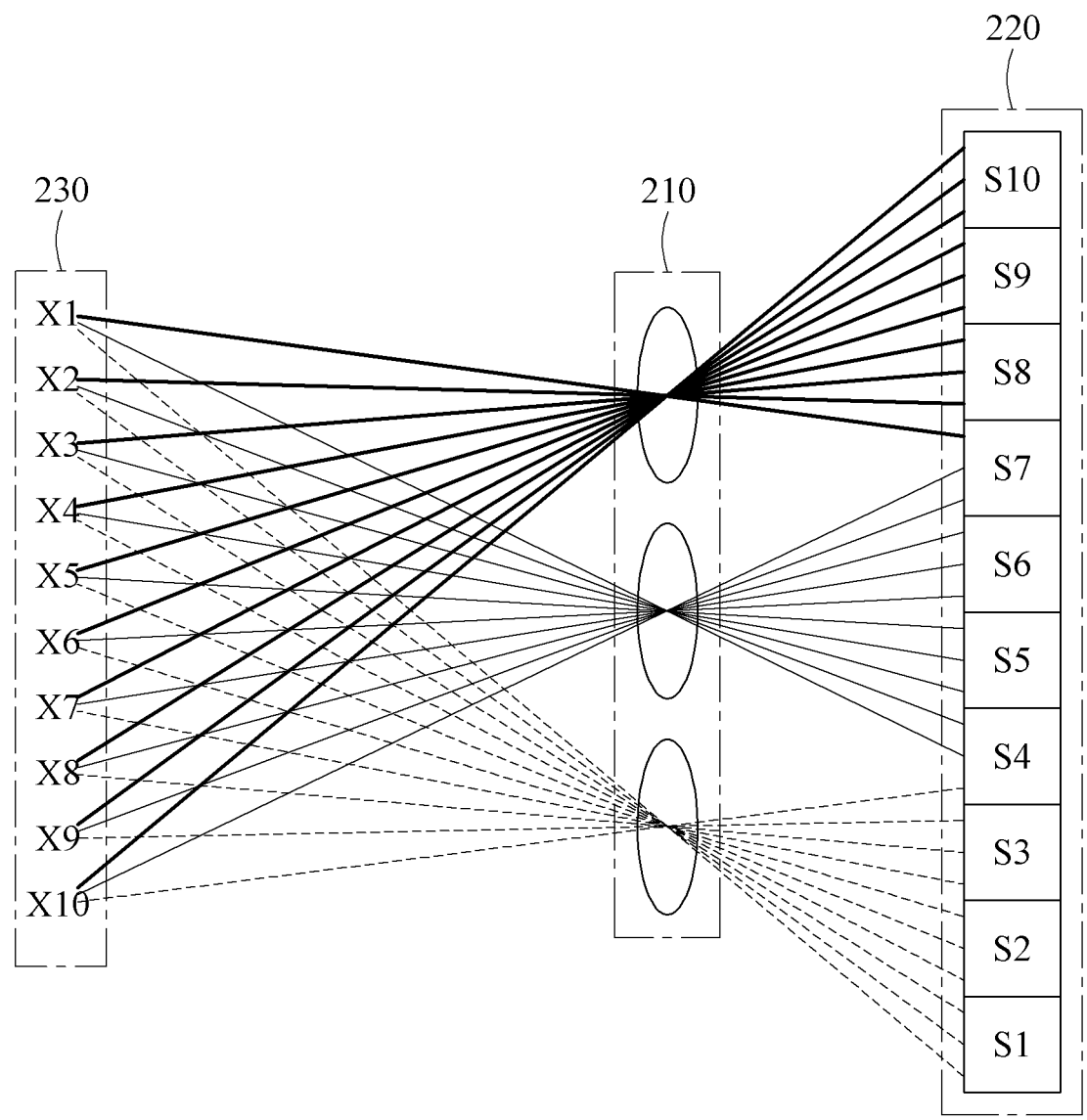
FIG. 2 is a diagram illustrating a sensing element receiving a ray through a lens element according to an example embodiment.

FIG. 2 is a diagram illustrating a sensing element receiving a ray through a lens element according to an example embodiment.

A light field may be emitted from a predetermined target point and may be a field indicating directions and intensities of rays reflected at a predetermined point on a subject. Light field information may be information obtained by combining a plurality of light fields. Since a direction of a primary ray of each lens element is also be changed, different light field information may be received in sensing areas. Accordingly, the imaging device may acquire optically more sensing information.

As illustrated in FIG. 2, a sensing array 220 may receive and detect rays corresponding to individual points 230 (e.g., X1 through X10). A plurality of rays emitted from the individual points 230 may form light fields. Rays emitted from a first point (e.g., X1) may form a first light field and be incident onto a first sensing element (e.g., S1), a fourth sensing element (e.g., S4), and a seventh sensing element (e.g., S7). Rays emitted from remaining points X2 through X10 may also form corresponding light fields. The individual points 230 may be points on a predetermined object, for example, a subject. The rays emitted from the individual points 230 may be rays such as sunlight reflected from the object. As a cross-sectional view illustrating an example of an imaging device, FIG. 2 illustrates a lens array 210 including three lens elements along one axis and the sensing array 220 including ten sensing elements S1 through S10 for convenience of description. However, it is merely an example, and example embodiments are not limited thereto.

The sensing elements S1 through S10 may sense rays passing through a plurality of lens elements and overlapping one another. The sensing element S1 may generate overlapping sensing information, for example, an intensity value of the rays emitted from the points X1 through X3. Likewise, the sensing elements S2 through S10 may also generate overlapping sensing information. The image sensor may restore the overlapping sensing information.

The sensing information generated by the sensing elements S1 through S10 shown in FIG. 2 may be modeled as original signal information, for example, an intensity value corresponding to the ray incident from the points 230 according to Equation 1 below.

$$S = T \cdot X \qquad \text{[Equation 1]}$$

In Equation 1, S denotes a matrix indicating sensing information, for example, a detected intensity value sensed by individual sensing elements. X denotes a matrix indicating a signal value corresponding to rays incident from the individual points onto the sensing elements S1 through S10, for example, a color intensity value of the incident rays. T denotes a transformation matrix, and may indicate a relationship between the sensing information sensed by the sensing elements S1 through S10 and signal information corresponding to incident light. In the structure shown in FIG. 2, the rays corresponding to the individual points X1 through X10, the lens elements, and the sensing elements S1 through S10 may be modeled as shown in Equation 2 below. In Equation 2, the individual points X1 through X10 may be modeled as being located at infinite focal points from the image sensor. Distances between the individual points X1 through X10 and the image sensor may each be greater than a threshold distance.

$$\begin{bmatrix} S1 \\ S2 \\ S3 \\ S4 \\ S5 \\ S6 \\ S7 \\ S8 \\ S9 \\ S10 \end{bmatrix} = \begin{bmatrix} 1 & 1 & 1 & 0 & 0 & 0 & 0 & 0 & 0 & 0 \\ 0 & 0 & 0 & 1 & 1 & 1 & 0 & 0 & 0 & 0 \\ 0 & 0 & 0 & 0 & 0 & 1 & 1 & 1 & 0 \\ 1 & 1 & 0 & 0 & 0 & 0 & 0 & 0 & 0 & 1 \\ 0 & 0 & 1 & 1 & 1 & 0 & 0 & 0 & 0 & 0 \\ 0 & 0 & 0 & 0 & 0 & 1 & 1 & 1 & 0 & 0 \\ 1 & 0 & 0 & 0 & 0 & 0 & 0 & 0 & 1 & 1 \\ 0 & 1 & 1 & 1 & 0 & 0 & 0 & 0 & 0 & 0 \\ 0 & 0 & 0 & 0 & 1 & 1 & 1 & 0 & 0 & 0 \\ 0 & 0 & 0 & 0 & 0 & 0 & 0 & 1 & 1 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \qquad \text{[Equation 2]}$$

In Equation 2, for convenience of description, ray signal information corresponding to the individual points X1 through X10, for example, ray intensity values are denoted as X1 through X10. In addition, sensing information sensed by the sensing elements S1 through S10, for example, sensing intensity values are denoted as S1 through S10. According to an example embodiment, a relationship in the aforementioned transformation matrix between the sensing information corresponding to the sensing elements S1 through S10 included in the sensing array 220 and original signals corresponding to the rays incident from the individual points X1 through X10 may be determined based on the arrangement of the lens elements and the sensing elements, the number of lens elements included in the lens array 210, the number of sensing elements S1 through S10 included in the sensing array 220, and the like.

Equation 2 corresponds to a case in which the individual points X1 through X10 are infinite focal points from the image sensor. When the individual points X1 through X10 are located at finite focal points from the image sensor, an original signal received in each sensing element may vary based on a distance between a subject and the image sensor and a geometric structure of the image sensor.

As described above, the imaging device may acquire a plurality of low-resolution input images based on various sensing information acquired, and restore an output image with a higher resolution than that of the low-resolution input images from the low-resolution input images. A method of generating a single image by rearranging a plurality of low-resolution input images is described with reference to FIG. 3.

Figure 3:
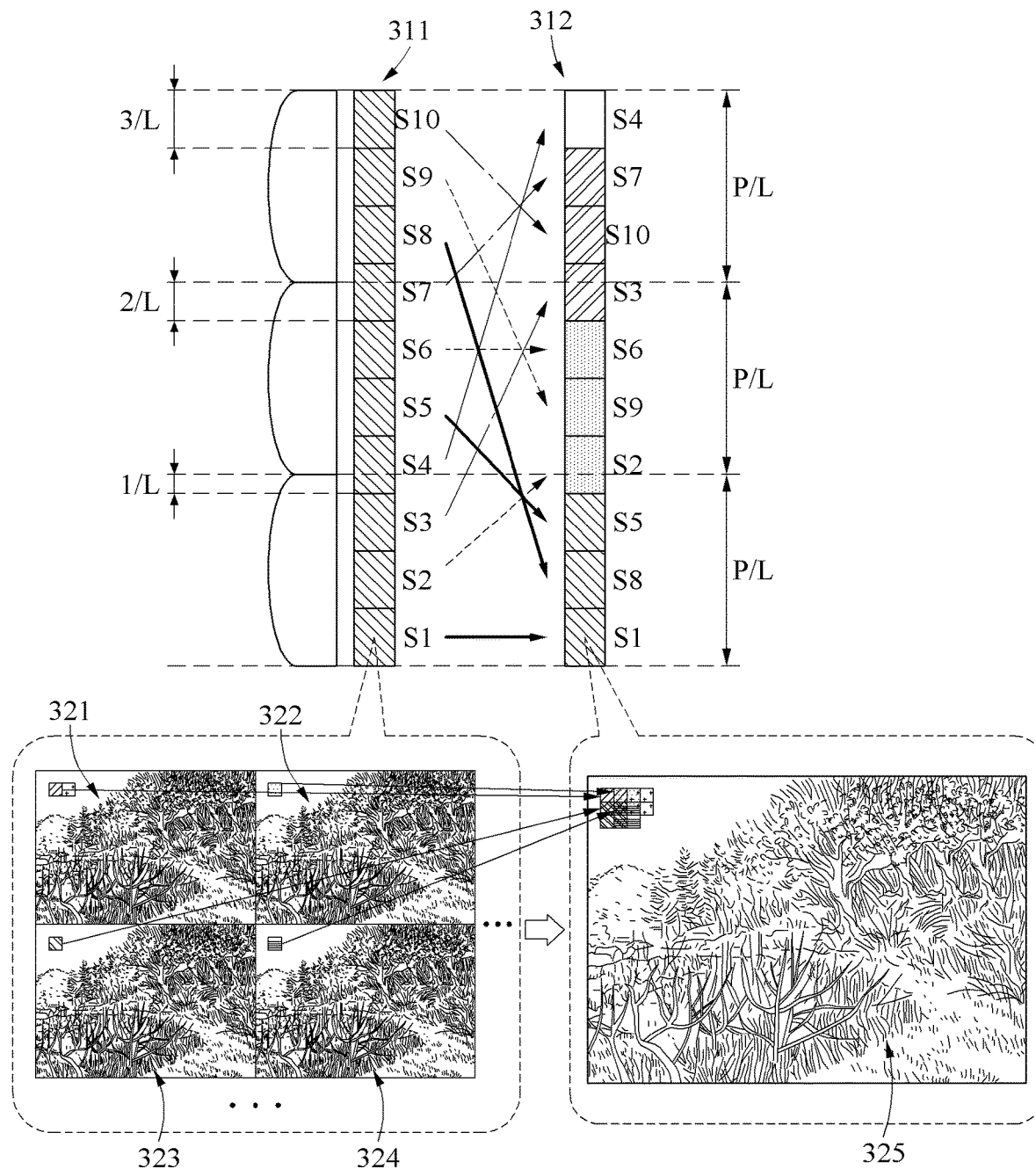
FIG. 3 is a diagram illustrating a relationship between a number of sensing elements and a number of lens elements according to an example embodiment.

FIG. 3 is a diagram illustrating a relationship between a number of sensing elements and a number of lens elements according to an example embodiment.

As described above, an imaging optical lens and a sensing array may be arranged in a fractional alignment structure. FIG. 3 illustrates an example in which a ratio P/L between a number L of lens elements and a number P of sensing elements is 10/3.

In the geometric structure of the lens array and sensing array described above, sensing elements covered by each lens element may receive light field information different from light field information sensed by a sensing element covered by another lens element. In the structure of FIG. 2, the first sensing element S1 may receive light field information including a combination of a first light field of the first point X1, a second light field of the second point X2, and a third light field of the third point X3. In contrast, in the structure of FIG. 2, a second sensing element (e.g., S2) neighboring the first sensing element S1 may receive light field information including a combination of a fourth light field, a fifth light field, and a sixth light field. As such, each sensing element may receive light field information different from light field information sensed in another sensing element.

To generate an image of a high resolution, an imaging device and/or image sensor may rearrange in-image pixel positions of pixels indicating the same or adjacent positions on a subject in a plurality of captured low-resolution images based on a correlation between light field information. A pixel is a picture element and may indicate a unit element constituting an image. The pixel position is a position of a pixel in an image and may include coordinates of the pixel. For example, the imaging device and/or the image sensor may construct pixel information of a high-resolution image by contiguously rearranging pixel positions of pixels corresponding to sensing elements receiving similar light field information to be adjacent to each other. As described above, each sensing element may receive light field information in which a plurality of light fields overlaps. In terms of two items of light field information sensed by two sensing elements, a correlation between the two items of light field information may increase as one light field information includes more the same light field as another light field information. The rearrangement of the pixel positions of the pixels may be performed based on a depth at which the corresponding pixel is captured. As an example, the depth at which the pixel is captured may be set to a predetermined depth value, estimated through stereo image matching, or measured by a depth sensor. As another example, the rearrangement of the pixel positions of the pixels may also be performed by a neural network designed to rearrange the pixel positions based on a depth at which a subject is captured without measuring and/or estimating the depth at which the pixel is captured. The aforementioned rearrangement of the pixel positions may also be referred to as a pixel shuffle. For example, a neural network designed to output a single output image from an input compound-eye vision image may be used to rearrange the pixel positions of the pixels. The neural network may be trained based on a training data set obtained by capturing a subject at various depths.

The image sensor may assume that points reflecting rays are located at infinite focal points farther than a threshold distance from the image sensor, and determine light field information to be sensed in each sensing element. The image sensor may determine points emitting light fields sensed in each of a plurality of sensing elements based on a positional relationship between the sensing elements and the rays emitted from points farther than the threshold distance. The image sensor may rearrange the pixel positions of the pixels such that pixel positions of pixels corresponding to an output value output by a sensing element receiving light fields emitted from points spatially adjacent to each other on the subject are adjacent.

For reference, FIG. 2 shows the individual points X1 through X10 in an order of being spatially adjacent to each other at an infinite focal distance. The first point X1 may be adjacent to the second point X2. The second point X2 may be adjacent to the first point X1 and the third point X3.

Referring to FIG. 3, among sensing elements 311 not rearranged yet, light field information sensed in the first sensing element S1 and light field information sensed in an eighth sensing element (e.g., S8) may include light fields corresponding to the second point X2 and the third point X3.

Accordingly, the first sensing element S1 and the eighth sensing element S8 may receive similar light field information. Equation 3 represents a result obtained by rearranging pixel positions of pixels corresponding to the similar light field information according to Equation 2 above. In this disclosure, a pixel position may be coordinates at which a pixel is positioned.

$$\begin{bmatrix} S1 \\ S8 \\ S5 \\ S2 \\ S9 \\ S6 \\ S3 \\ S10 \\ S7 \\ S4 \end{bmatrix} = \begin{bmatrix} 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 1 & 0 & 0 & 0 & 0 & 0 & 0 & 0 & 1 & 1 \\ 1 & 1 & 0 & 0 & 0 & 0 & 0 & 0 & 0 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \quad \text{[Equation 3]}$$

Sensing elements 312 rearranged according to Equation 3 may be as shown in FIG. 3. The first sensing element S1 may be covered by a first lens. The eighth sensing element S8 may be covered by a third lens. A fifth sensing element (e.g., S5) may be covered by a second lens. Since sensing information sensed in each sensing element corresponds to a pixel constituting an image, the image sensor and/or imaging device may rearrange pixels such that sensing information corresponding to rays passing through different lenses are adjacent. A reconstructed image 325 may be an image in which pixel positions of pixels having sensing values obtained by sensing elements receiving similar light field information in low-resolution images 321, 322, 323, and 324 captured by individual lenses are arranged to be adjacent.

Figure 4:
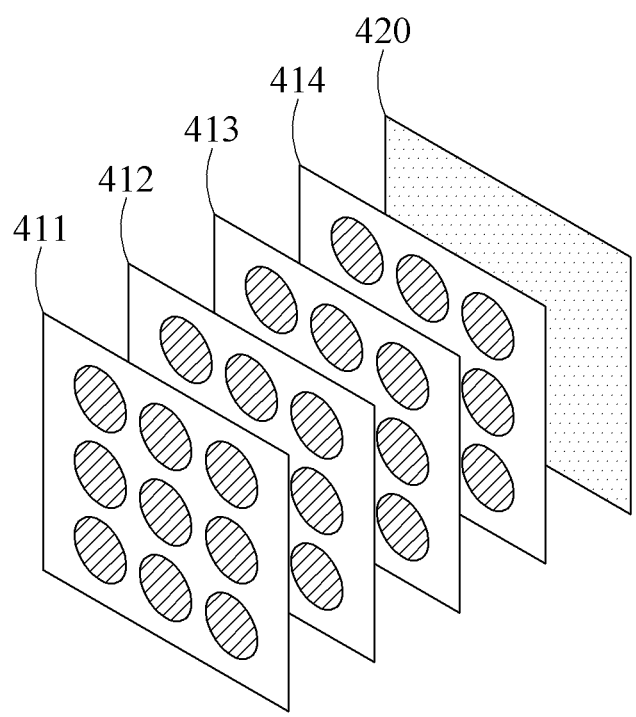
FIG. 4 illustrates a configuration of an imaging device having multiple layers according to an example embodiment.

FIG. 4 illustrates a configuration of an imaging device having multiple layers according to an example embodiment.

According to an example embodiment, an imaging device may include a plurality of imaging lens arrays. The plurality of imaging lens arrays may include a plurality of imaging optical lenses that transfers light received from outside. The plurality of imaging lens arrays may be arranged on an image sensor 420. A sensing array of the image sensor 420 may include a plurality of sensing elements sensing light passing through the plurality of imaging lens arrays. Since the description of FIGS. 1A and 1B is applicable to the image sensor 420, redundant description will be omitted.

In terms of the imaging device, a change of an optical zoom is the same as a change of a field of view (FOV). The imaging device may change the FOV by changing a focal length of a lens while maintaining a size of the image sensor 420 and a working distance from the lens to a subject. As such, since a spatial position movement between lenses is not required for implementing the optical zoom, a space for a mechanical structure that moves the lens may not be required. In other words, the imaging device may provide a dynamic optical zoom even without using a protrusion part that protrudes to an outside of a camera body and the image sensor 420 to accommodate the mechanical structure for the optical zoom.

In addition, since each lens array of the imaging device includes a plurality of lens elements, a focal length required for each of the lens elements to achieve a target resolution may be reduced. Accordingly, the imaging device may be an ultra-thin camera device that captures a high-resolution image at various zoom magnifications. The imaging device may be implemented as a mobile terminal such as a smartphone, a tablet PC, a foldable smartphone, and the like having a thickness of several millimeters, for example.

The imaging device may be in a multi-layer multi-lens array (MMLA) structure. The MMLA structure may have a total track length (TTL) within several millimeters. Each of the plurality of lens arrays may include a plurality of lens elements arranged in a form of an array. The plurality of lens arrays and the plurality of lens elements may be located at positions fixed in a device. The imaging device may adjust an effective focal length (EFL) of an imaging optical system by changing optical power of one or more lens elements among the plurality of lens elements. The imaging device may continuously change the effective focal length. The FOV may be changed in accordance with the change of the effective focal length. A large effective focal length may be realized as a small space by the multi-lens array.

According to an example embodiment, at least one imaging lens array among the plurality of imaging lens arrays in the imaging device may include an active imaging lens of which a focal length is variable. One imaging lens array may correspond to one layer, and a plurality of imaging lens arrays may form an imaging optical system. The plurality of imaging lens arrays may also be referred to as a multi-layer or a multi-lens layer. All imaging lenses of the imaging lens array including the active imaging lens may be the active imaging lens. For example, FIG. 4 illustrates the image sensor 420 and multi-lens layers 411-414 separated along an optical axis. Some imaging lens arrays among the plurality of imaging lens arrays may include an active lens element. The active lens element may be a lens element of which a focal length is adjustable. An effective focal length of the imaging optical system may be adjusted by the active lens element.

The following description will be made based on a case in which the imaging device includes four imaging lens arrays, a fourth imaging lens array 414 most adjacent to the image sensor 420 and a first imaging lens array 411 located farthest from the image sensor 420 include passive lens elements, and a second imaging lens array 412 and a third imaging lens array 413 located therebetween include active lens elements. However, it is merely an example, and the imaging optical system of the imaging device is not limited thereto. For example, the plurality of imaging lens arrays may include three or more arrays. In addition, among the plurality of imaging lens arrays, a lens array most adjacent to the image sensor 420 and a lens array farthest from the image sensor 420 may include active lens elements. Also, some arrays of the plurality of imaging lens arrays may be implemented as active lens arrays and some other imaging lens arrays of the plurality of imaging lens arrays may include a passive imaging lens having a fixed focal length. Further, all arrays may be implemented as active lens arrays.

Figure 5A:
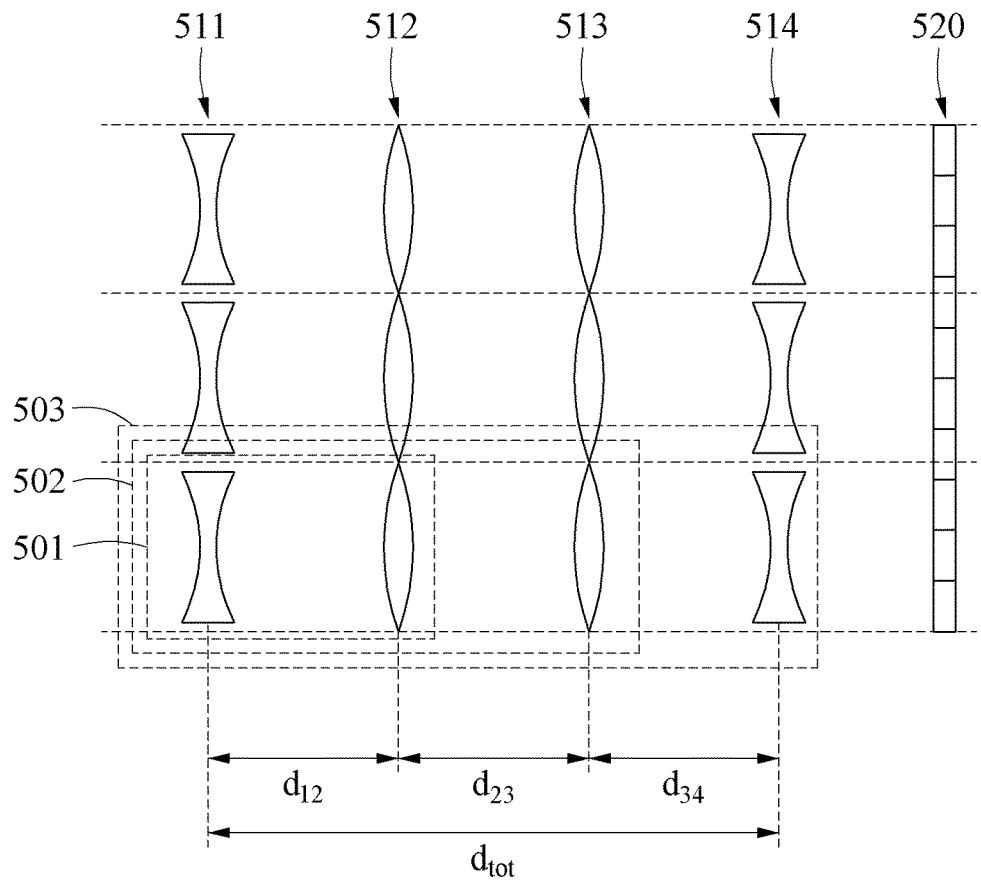
FIG. 5A illustrates an effective focal length of an imaging device according to an example embodiment.
Figure 5B:
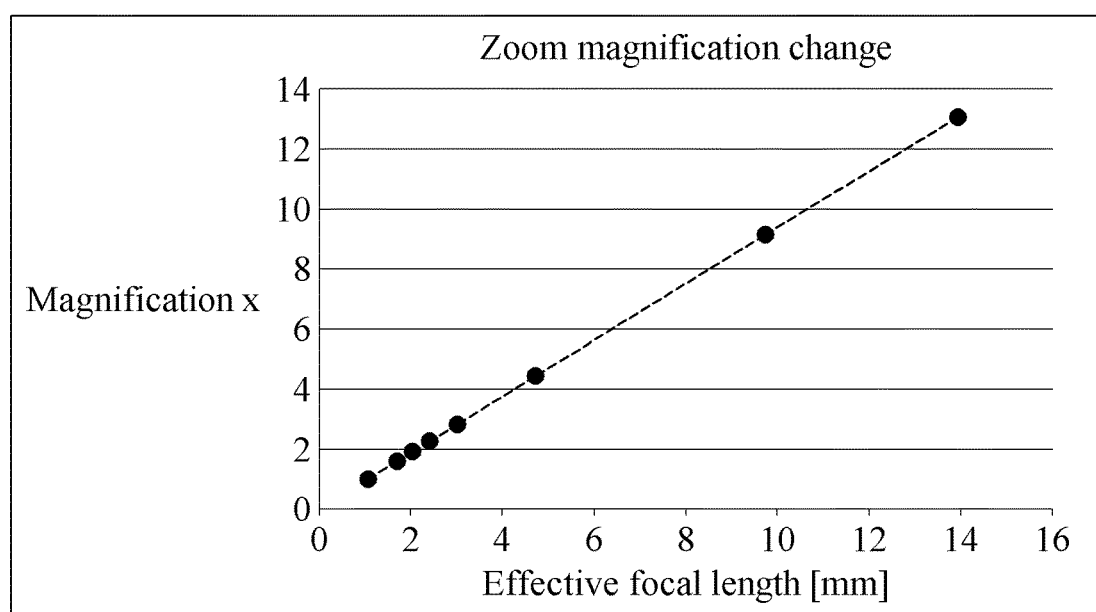
FIG. 5B illustrates a relationship between an effective focal length and a zoom magnification.

FIG. 5A illustrates an effective focal length of an imaging device according to an example embodiment, and FIG. 5B illustrates a relationship between an effective focal length and a zoom magnification.

According to an example embodiment, an imaging device may include a passive lens array, an active lens array, and an image sensor 520. The passive lens array may be an imaging lens array including a passive lens element. The active lens array may be an imaging lens array including an active lens element. All lenses of the imaging lens array including the active imaging lens may be deformed to have the same focal length. Each imaging lens array may include lens elements of the same type. For example, all imaging lens elements included in one imaging lens array may be passive lenses or active lenses. An example in which a first imaging lens array 511 and a fourth imaging lens array 514 are passive lens arrays, and a second imaging lens array 512 and a third imaging lens array 513 are active lens arrays will be described with reference to FIG. 5A.

Each lens element may be a positive lens or a negative lens. The positive lens may be a converging lens that has positive optical power and may be, for example, a convex lens. The negative lens may be a diverging lens that has negative optical power and may be, for example, a concave lens. Optical power is a force by which a lens element changes a direction of light and represents a degree to which a curved surface of the lens converges or diverges a ray. In addition, the optical power is a reciprocal of a focal length and may be expressed in units of a diopter (D). Each imaging lens array may include lens elements having optical power of the same sign. For example, all imaging lens elements included in one imaging lens array may be the positive lens or the negative lens. Although FIG. 5A illustrates the first imaging lens array 511 and the fourth imaging lens array 514 as a negative lens array and illustrates the second imaging lens array 512 and the third imaging lens array 513 as a positive lens array, the disclosure is not to be taken as being limited thereto. In addition, depending on driving of an active lens, the aforementioned active lens array may be converted from the positive optical power to the negative optical power or, conversely, converted from the negative optical power to the positive optical power.

According to an example embodiment, the imaging device may include the positive lens array and the negative lens array. Among the plurality of imaging lens arrays, one imaging lens array may include a positive lens element and another imaging lens array may include a negative lens element. All imaging optical lenses included in the one imaging lens array may be the positive lens, and all imaging optical lenses included in the other imaging lens array may be the negative lens. For example, as illustrated in FIG. 5A, the first imaging lens array 511 and the fourth imaging lens array 514 may include the negative lens element, and the second imaging lens array 512 and the third imaging lens array 513 may include the positive lens element.

The positive lens array may be denoted as P and the negative lens array may be denoted as N. In the imaging optical system, a combination of refractive signs of lens arrays along an optical axis may be represented by a refractive sign sequence. The refractive sign sequence may indicate an order of signs of lenses through which light received from the outside passes sequentially along the optical axis. For example, a refractive sign sequence of lens arrays of the imaging optical system shown in FIG. 5A may be an N-P-P-N type structure. The light may pass through the negative lens array, two positive lens arrays, and the negative lens array, in sequence. However, the disclosure is not limited thereto, and as such, according to another example embodiment, various refractive sign combinations such as an N-P-N-N type structure, an N-N-P-N type structure, a P-N-N-P type structure, a P-N-P-P type structure, and a P-P-N-P type structure may be applied to the imaging optical system. Moreover, although FIG. 5A illustrates four lens arrays as an example, the disclosure is not limited thereto. As such, according to another example embodiment, in a case of three lens arrays, a combination such as a P-N-P type, an N-P-N type structure, a P-P-N type structure, an N-P-P type structure, an N-N-P type structure, and a P-N-N type structure may be included in the imaging optical system. Although the example of four lens arrays and the example of three lens arrays are described for convenience, the disclosure is not limited thereto. As such, depending on an example embodiment, three or more lens arrays may be provided and various refractive sign combinations may be used. The following description will be given of four lens arrays.

According to an example embodiment, an effective focal length by the plurality of imaging lens arrays may be determined based on focal lengths of the imaging optical lenses included in the plurality of imaging lens arrays and intervals between the imaging lens arrays on the optical axis. According to an example embodiment, the intervals may be the distances between the imaging lens arrays on the optical axis. The effective focal length is described using the following equations. For reference, in FIG. 5A, the lens elements included in each imaging lens array may have the same focal length and be spaced apart from another imaging lens array at the same distance.

$$f_{12} = F_1 = \frac{f_1 f_2}{f_1 + f_2 - d_{12}} \quad \text{[Equation 4]}$$

In Equation 4, $F_1$ denotes an effective focal length $f_{12}$ of an imaging optical system 501 by the first imaging lens array 511 and the second imaging lens array 512. Here, $f_1$ denotes a focal length of a lens element included in the first imaging lens array 511, $f_2$ denotes a focal length of a lens element included in the second imaging lens array 512 and $d_{12}$ denotes a distance between the first imaging lens array 511 and the second imaging lens array 512.

$$F_2 = \frac{F_1 f_3}{F_1 + f_3 - d_{23}} \quad \text{[Equation 5]}$$

In Equation 5, $F_2$ denotes an effective focal length of an imaging optical system 502 by the imaging optical system 501 and the third imaging lens array 513. Here, $f_3$ denotes a focal length of a lens element included in the third imaging lens array 513 and $d_{23}$ denotes a distance between the second imaging lens array 512 and the third imaging lens array 513.

$$F_3 = \frac{F_2 f_4}{F_2 + f_4 - d_{34}} \quad \text{[Equation 6]}$$

In Equation 6, $F_3$ denotes an effective focal length of an imaging optical system 503 by the imaging optical system 502 and the fourth imaging lens array 514. Here, $f_4$ denotes a focal length of a lens element included in the fourth imaging lens array 514 and $d_{34}$ denotes a distance between the third imaging lens array 513 and the fourth imaging lens array 514. As illustrated in FIG. 5A, the imaging optical system includes four lens arrays and thus, may be described as Equation 6. An effective focal length of an imaging optical system including N arrays may be generalized as shown in Equation 7 below.

$$F_{N-1} = \frac{F_{N-2} f_N}{F_{N-2} + f_N - d_{N-1,N}} \quad \text{[Equation 7]}$$

In Equation 7, N denotes a number of imaging lens arrays included in the imaging optical system. Here, N is an integer greater than or equal to 3, $F_{N-2}$ denotes an effective focal length of an imaging optical system including the first imaging lens array 511 through an (N−1)-th imaging lens array, $f_N$ denotes a focal length of a lens element included in an N-th imaging lens array, $d_{N-1,N}$ denotes a distance between the (N−1)-th imaging lens array and the N-th imaging lens array and $d_{tot}$ denotes a total sum of distances between the imaging lens arrays.

In the imaging optical system of the imaging device, the distance between the plurality of imaging lens arrays on the optical axis may be fixed. In addition, a distance between a sensing array and an imaging lens array most adjacent to the sensing array among the plurality of imaging lens arrays on the optical axis may be fixed. The imaging device may change a focal length of the active imaging lens by changing at least one of a thickness and a sagittal value of an active lens included in the active lens array among the imaging lens arrays. In the example of FIG. 5A, the second imaging lens array 512 and the third imaging lens array 513 are the active lens array. The imaging device may adjust the effective focal length $F_3$ of the entire imaging optical system by changing at least one of the focal length $f_2$ of the second imaging lens array 512 and the focal length $f_3$ of the third imaging lens array 513. As described above, the change of the effective focal length may correspond to changes of the FOV and the zoom magnification. As shown in a graph 590 of FIG. 5B, the effective focal length may be approximately linearly proportional to the zoom magnification. Accordingly, the imaging device may capture a zoom image at a variable magnification through the change of the effective focal length without changing a position of the imaging lens on the optical axis.

In the imaging device according to an example embodiment, the effective focal length of the plurality of imaging lens arrays may be adjusted based on a target magnification. According to an example embodiment, the effective focal length of the plurality of imaging lens arrays may be adjusted in response to a target magnification being selected. For example, the imaging device may receive a manipulation of indicating the target magnification from a user. When the imaging device is an electronic terminal (e.g., smartphone) including a touch display, the imaging device may receive a manipulation of indicating one magnification among a plurality of set magnifications and/or manipulation (e.g., a pinch-in gesture or pinch-out gesture) of continuously changing a magnification while a camera application is executed. The imaging device may adjust the effective focal length of the imaging optical system based on the target magnification selected by the manipulation of the user.

Figure 6:
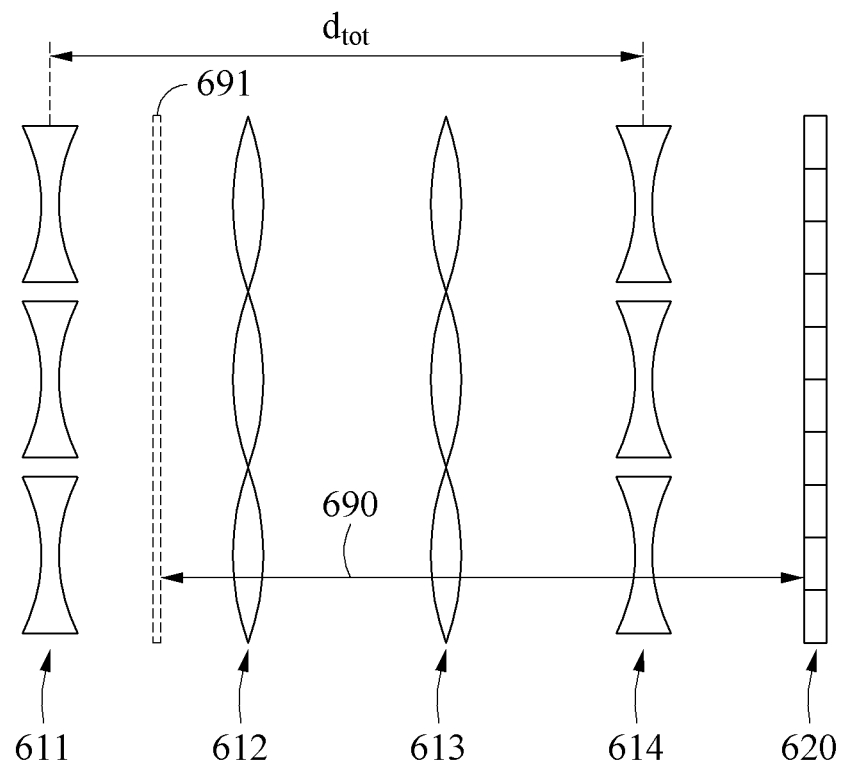
FIGS. 6 through 8 illustrate an adjustment of an effective focal length based on driving of an active imaging lens according to an example embodiment.
Figure 7:
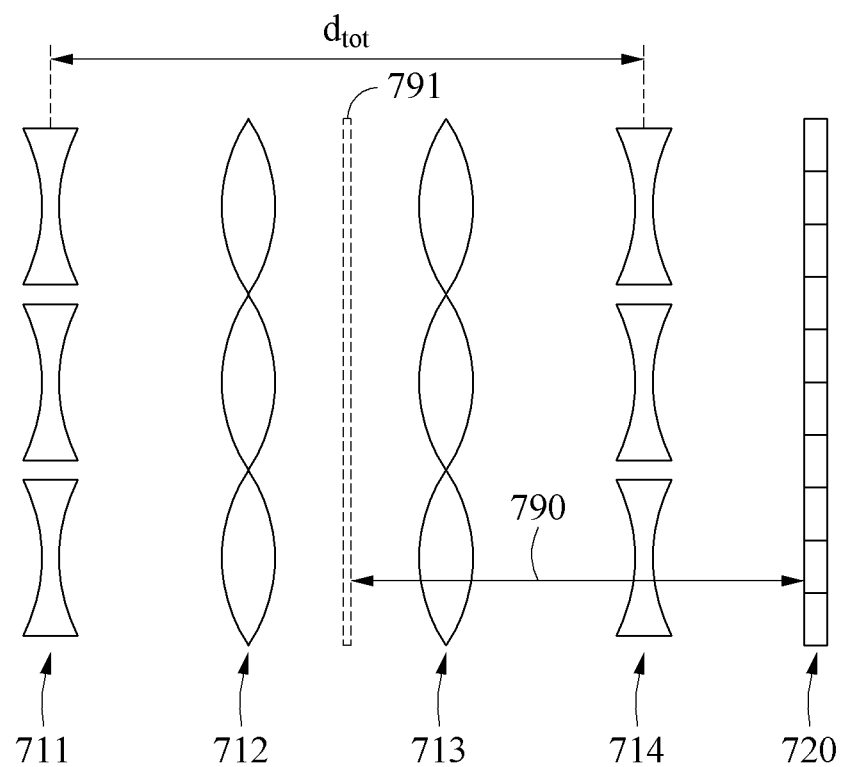
Figure 8:
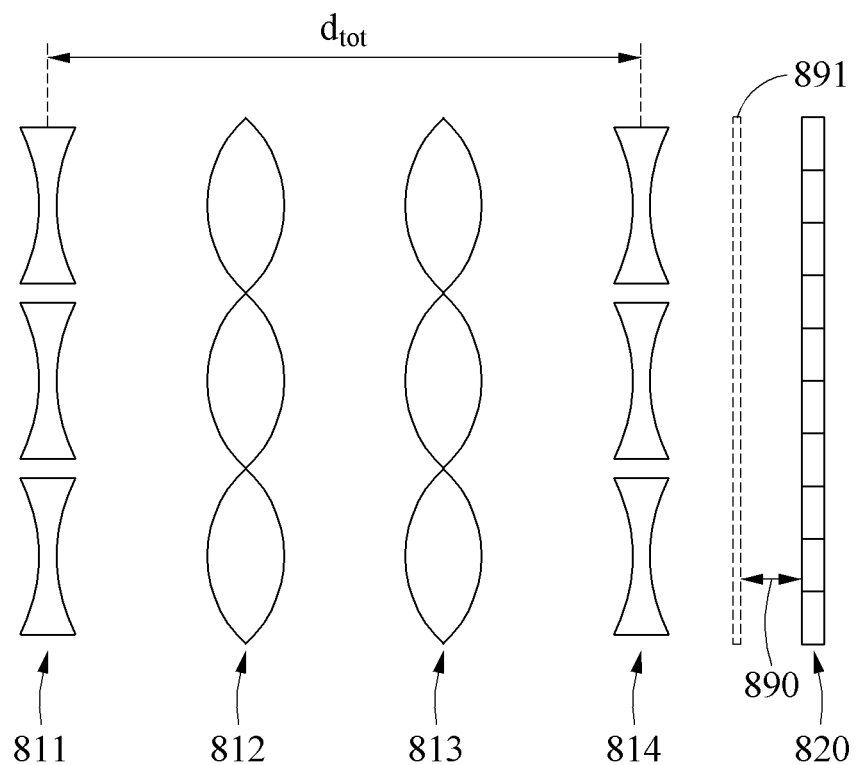

FIGS. 6 through 8 illustrate an adjustment of an effective focal length based on driving of an active imaging lens according to an example embodiment.

FIG. 6 illustrates an example of implementing a telephoto image capture. FIG. 7 illustrates an example of implementing a standard zoom image capture. FIG. 8 illustrates an example of implementing a wide angle image capture. An imaging optical system of an imaging device of FIG. 6 may have an effective focal length 690 larger than an effective focal length 790 of an imaging optical system of FIG. 7. The imaging optical system of the imaging device of FIG. 6 may have an FOV smaller than that of the imaging optical system of FIG. 7. The imaging optical system of FIG. 7 may have an effective focal length 790 that is an intermediate effective focal length between the effective focal length 690 of the imaging optical system of FIG. 6 and an effective focal length 890 of an imaging optical system of FIG. 8. The imaging optical system of FIG. 7 may have an intermediate FOV between FOVs of the imaging optical systems of FIGS. 6 and 8. The imaging optical system of FIG. 8 may have the effective focal length 890 smaller than the effective focal length 790 of the imaging optical system of FIG. 7 and have a greatest FOV.

Referring to FIGS. 6 through 8, the imaging device may adjust focal lengths of lens elements included in second imaging lens arrays 612, 712, and 812 and third imaging lens arrays 613, 713, and 813. First imaging lens arrays 611, 711, and 811 and fourth imaging lens arrays 614, 714, and 814 may be passive lens arrays having fixed focal lengths. In FIGS. 6 through 8, sagittal values of the lens elements included in the second imaging lens arrays 612, 712, and 812 and the third imaging lens arrays 613, 713, and 813 may be adjusted, so that a degree of convexity of the lens elements corresponding to convex lenses is increased from FIG. 6 toward FIG. 8. That is, the degree of convexity of the lens elements corresponding to convex lenses in FIG. 7 is higher that the degree of convexity of the lens elements corresponding to convex lenses in FIG. 6, and the degree of convexity of the lens elements corresponding to convex lenses in FIG. 8 is higher that the degree of convexity of the lens elements corresponding to convex lenses in FIG. 7. However, this is because an N-P-P-N type structure is shown according to an example embodiment, but the disclosure is not limited thereto. According to example embodiments, in cases of other refractive sign combinations and other FOVs, sagittal values and thicknesses of the lens elements may be changed in other ways. As described below, the imaging device may control a voltage applied to the active lens array, thereby changing at least one of the sagittal value and the thickness of the active lens array and adjusting the focal length.

For reference, the effective focal lengths 690, 790, and 890 may be defined as distances from principal planes 691, 791, and 891 to image sensors 620, 720, and 820. The principal planes 691, 791, and 891 may be virtual planes at which incident light is bent due to refraction. According to an example embodiment of the disclosure, the principal planes 691, 791, and 891 may be virtual lenses on which light refraction starts under an assumption that the imaging optical system including a combination of imaging lens arrays is a single optical lens.

To operate with a telephoto zoom, the imaging device may position a principal plane of the imaging optical system to be adjacent to an imaging lens array farthest from the image sensor. For example, as illustrated in FIG. 6, the imaging device may adjust the focal lengths of the lens elements the second imaging lens array 612 and the third imaging lens array 613 which are the active lens array, thereby positioning the principal plane 691 between the first imaging lens array 611 and the second imaging lens array 612. As the principal plane 691 of the imaging optical system is closer to the imaging lens array farthest from the image sensor 620, the effective focal length 690 may increase and the FOV may decrease. Through this, the imaging device may capture an image corresponding to the telephoto zoom.

To operate with a standard zoom, the imaging device may position the principal plane 791 of the imaging optical system in a vicinity of the intermediate imaging lens array. The intermediate imaging lens array may be remaining imaging lens arrays other than an imaging lens array most adjacent to the image sensor 720 and an imaging lens array farthest from the image sensor 720. For example, in FIG. 7, the imaging device may position the principal plane 791 between the second imaging lens array 712 and the third imaging lens array 713. The imaging optical system of FIG. 7 may have an intermediate effective focal length and an intermediate FOV. In other words, the imaging device may capture an image corresponding to the standard zoom between the telephoto zoom and a wide-angle zoom.

To operate with the wide-angle zoom, the imaging device may position the principal plane 891 of the imaging optical system to be adjacent to an imaging lens array most adjacent to the image sensor 820. For example, as illustrated in FIG. 8, the imaging device may adjust focal lengths of the lens elements included in the second imaging lens array 812 and the third imaging lens array 813, thereby positioning the principal plane 891 of the imaging optical system to be adjacent to the fourth imaging lens array 814. Further, if an angle of view by the plurality of imaging lens arrays exceeds a super-wide threshold angle, the principal plane 891 formed by the plurality of imaging lens arrays 811, 812, 813, and 814 may be located between a sensing array and an imaging lens array most adjacent to the sensing array among the plurality of imaging lens arrays 811, 812, 813, and 814. The super-wide threshold angle may be an FOV set to be used for super-wide photographing. Since the FOC increases according to a decrease of the effective focal length, the imaging device may capture an image corresponding to the wide-angle zoom.

A structure in which a first imaging lens array and a third imaging lens array are the positive lens array, and a second imaging lens array and a fourth imaging lens array is the negative lens array is described with reference to Table 1 below. As shown in Table 1, the imaging device may vary a zoom magnification by changing focal lengths of the second imaging lens array and the third imaging lens array.

TABLE 1

| | Passive | Active | Active | Passive | Distance between lenses | | | EFL | | |
|---|---|---|---|---|---|---|---|---|---|---|
| | $f_1$ | $f_2$ | $f_3$ | $f_4$ | $d_{12}$ | $d_{23}$ | $d_{34}$ | $F_1$ | $F_2$ | $F_3$ |
| Telephoto | 5.18 | −5.19 | 2.6 | −1.72 | 1.42 | 1.21 | 0.74 | 18.95 | 2.42 | 106 |
| | | | 2.3 | | | | | | 2.19 | 13 |
| | | | 1.9 | | | | | | 1.83 | 5 |
| Standard | | −−2.35 | 1.7 | | | | | −8.65 | 1.80 | 4.7 |
| | | | 1.5 | | | | | | 1.56 | 3 |
| | | | 1.4 | | | | | | 1.43 | 2 |
| Wide-angle | | −1.48 | 1.30 | | | | | −3.35 | 1.34 | 2 |
| | | | 1.00 | | | | | | 0.94 | 1 |
| | | | 0.60 | | | | | | −0.5 | 0.45 |

In Table 1, each focal length, interval distance between lenses, and an effective focal length may be represented in units of millimeters (mm). An example in which focal lengths of the second imaging lens array and the third imaging lens array are changed in the imaging optical system having the P-N-P-N type structure is described. In Table 1, the imaging device may capture a 1× zoom image when the effective focal length is 1 mm. As described with reference to FIG. 5B, the effective focal length is linearly proportional to the zoom magnification. Thus, the imaging device may capture an image corresponding to an optical zoom of 100 times or more in the telephoto zoom. In other words, an optical system in which a plurality of imaging lens arrays is combined may provide a variable zoom magnification range between 0.5 times and 110 times, inclusive. For reference, each numerical value of Table 1 is merely an example and may vary based on design and operation. Although it is shown in Table 1 that the focal length of the second imaging lens array is −5.19 in the telephoto zoom, −2.35 in the standard zoom, and −1.48 in the wide-angle zoom, the focal length is not limited thereto. The focal length of the second imaging lens array may vary within an individual optical zoom range based on a design.

According to an example embodiment, the focal length of the active imaging lens may be adjusted based on an effective focal length corresponding to a selected target magnification. The imaging device may further include a memory in which focal length-related information corresponding to a plurality of pre-defined magnifications is stored for each of the plurality of imaging lens arrays. The imaging device may load focal length-related information corresponding to the selected target magnification and adjust a focal length of an active imaging lens based on the loaded focal length-related information. The focal length-related information corresponding to the target magnification may include, for example, a focal length of each imaging lens array to be set for forming the target magnification, and a thickness and a sagittal value as information associated with a lens shape in which each imaging lens element is to be formed in to form each focal length.

FIGS. 9A through 9D illustrate examples of an imaging lens according to an example embodiment.

Figure 9A:
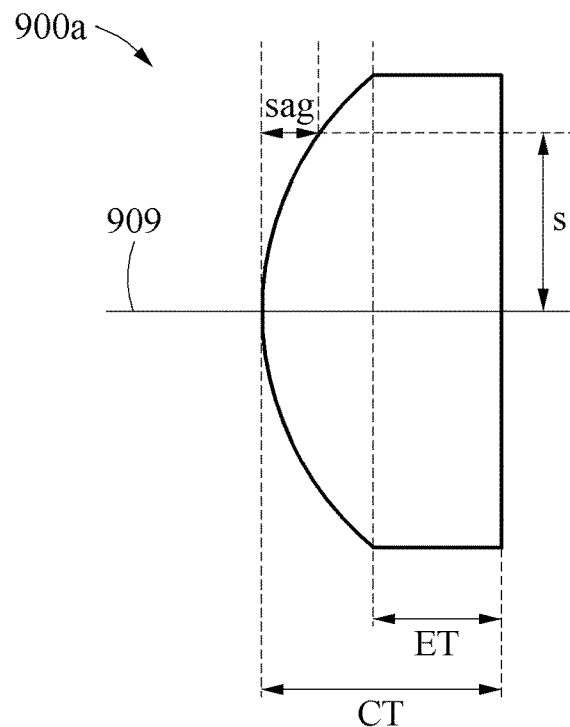
FIGS. 9A through 9D illustrate examples of imaging lenses according to an example embodiment.
Figure 9B:
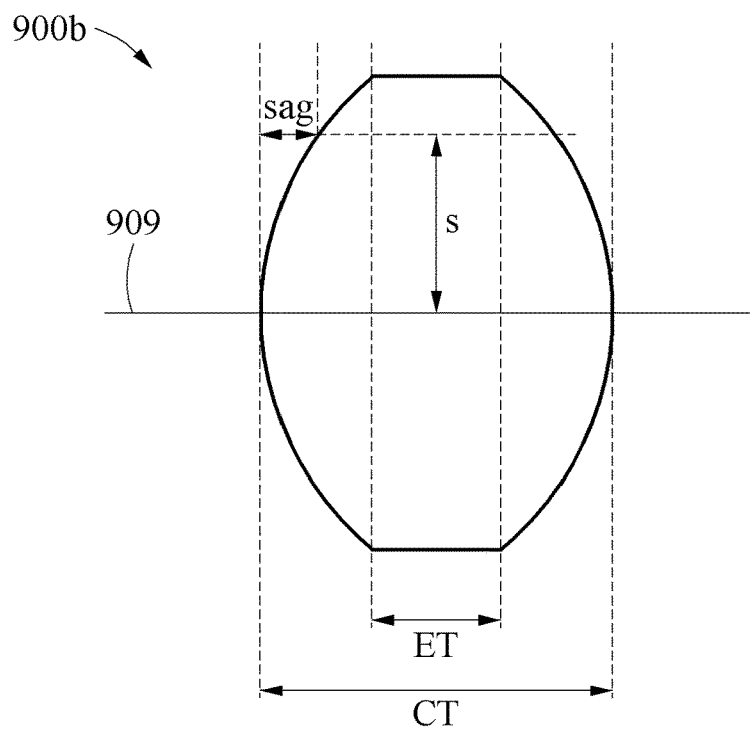
Figure 9C:
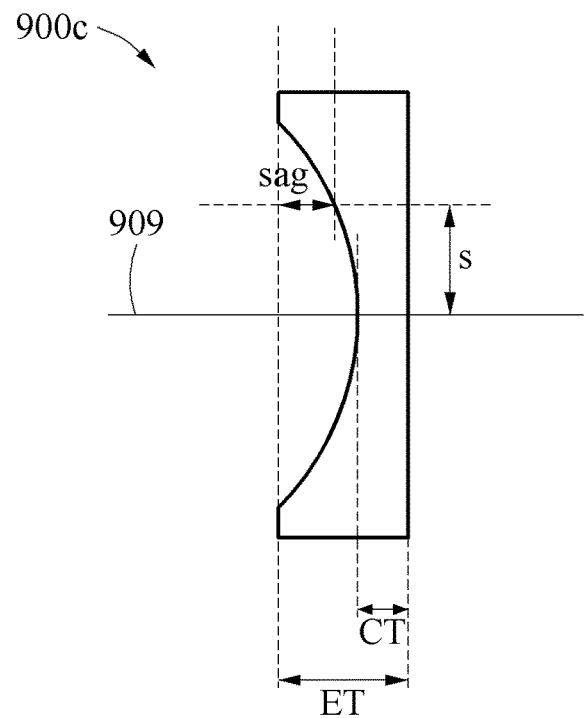
Figure 9D:
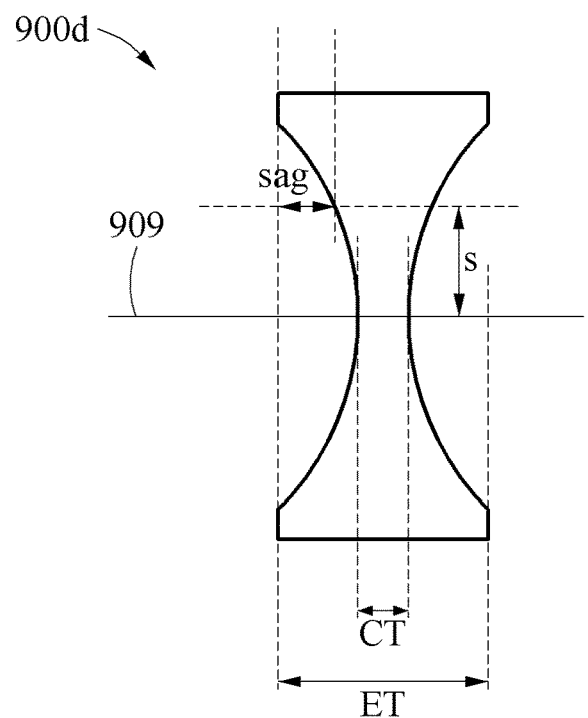

FIGS. 9A and 9B illustrate examples of positive lens elements, and FIGS. 9C and 9D illustrate examples of negative lens elements. A P-type lens of FIG. 9A may be a convex lens that has a convex shape on one side. A P-type lens of FIG. 9B may be a convex lens that has a convex shape on both sides. An N-type lens of FIG. 9C may be a concave lens that has a concave shape on one side. An N-type lens of FIG. 9D may be a concave lens that has a concave shape on both sides.

An imaging device may implement lens elements of the above-described imaging lens array using, for example, a convex lens 900*a* of FIG. 9A, a convex lens 900*b* of FIG. 9B, a concave lens 900*c* of FIG. 9C, and a concave lens 900*d* of FIG. 9D. As described with reference to FIGS. 10A and 10B below, the imaging device may adjust a thickness and a sagittal value of each lens element by applying an external force such as voltage to the corresponding lens element. For reference, when a height in a direction vertical to an optical axis 909 is denoted as s, the sagittal value may be a value indicating a distance along the optical axis from a tangent plane at a vertex of each spherical or aspherical surface at the height s to each spherical or aspherical surface. CT denotes a center thickness of a lens element and ET denotes an edge thickness.

The description of FIGS. 9A through 9D is given about example shapes of the imaging lens elements included in the imaging lens array described above, and are not construed as being limited thereto. A surface of the lens element may be designed to have the aspherical shape, and a sagittal value and a thickness of the aspherical shape may be changed by an external force such as voltage.

Figure 10A:
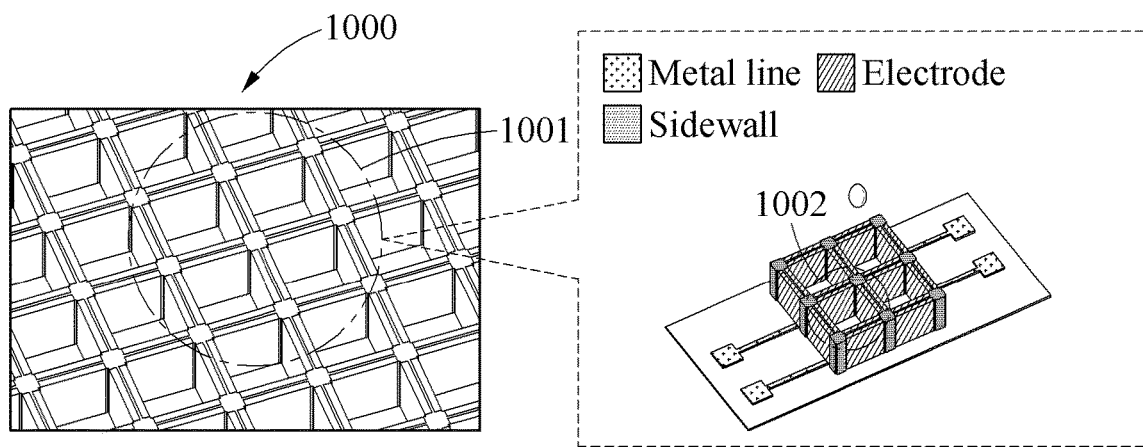
FIGS. 10A and 10B illustrate an example structure of an active imaging lens array according to an example embodiment.
Figure 10B:
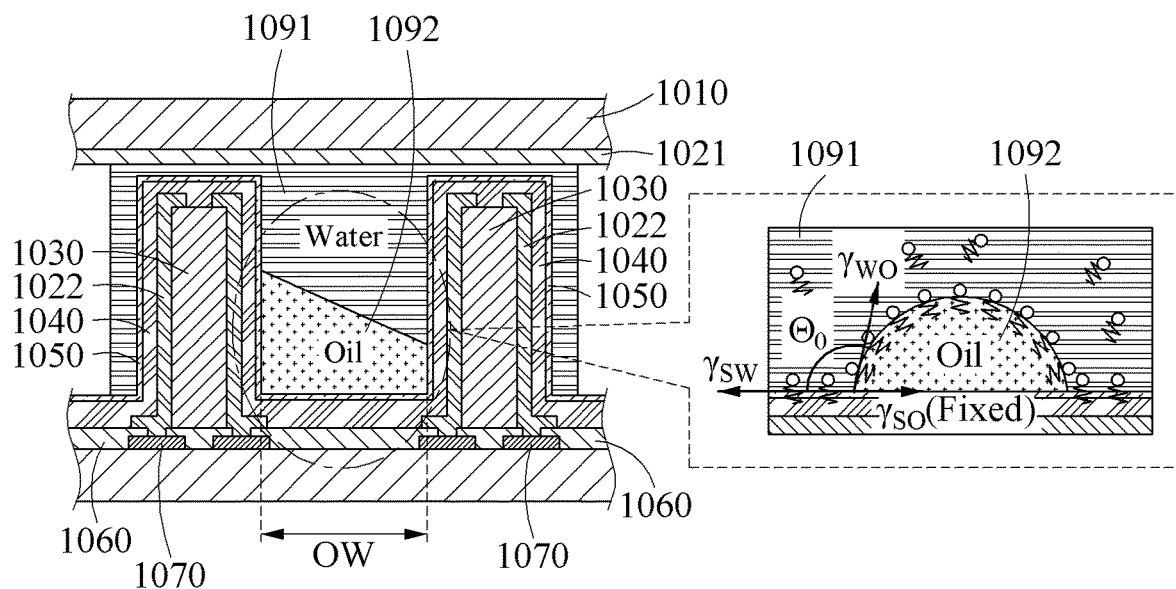

FIGS. 10A and 10B illustrate an example structure of an active imaging lens array according to an example embodiment.

According to an example embodiment of the disclosure, an electro-wetting lens of which a thickness and a sagittal value are adjusted based on an applied voltage is described as an example structure of an active lens element. However, the disclosure is not limited thereto, and as such, according to another example embodiment, the active lens element may include lenses of various structures with variable focal lengths, such as a liquid crystal (LC) lens. Hereinafter, a structure in which electro-wetting lenses are arranged on a plane as an active lens element is described with reference to FIGS. 10A and 10B.

An active lens array 1000 of FIG. 10A may include electro-wetting lenses arranged on a plane in an array pattern (e.g., grid pattern). As shown in an enlarged portion 1001 of the active lens array 1000 of FIG. 10A, an electro-wetting lens 1002 may include four sidewalls, an electrode corresponding to each of the sidewalls, and a metal line through which voltage is applied to each electrode.

FIG. 10B is a cross-sectional view illustrating an example structure of the electro-wetting lens 1002 described with reference to FIG. 10A. The electro-wetting lens 1002 may also be referred to as an electro-wetting optical element. The electro-wetting lens 1002 may include four sidewalls that define a space for accommodating a fluid, an upper electrode 1021 disposed on the sidewalls, and a glass substrate 1010 disposed on the upper electrode 1021. Each of the sidewalls may include an organic partition wall 1030, a side electrode 1022, a dielectric material 1040, and hydrophobic coating 1050. Four side electrodes 1022 may be provided for each electro-wetting lens 1002, but the number of side electrodes is not limited thereto. A partition wall of the electro-wetting lens 1002 may be placed on a passivation, for example, an interlayer insulating layer 1060. The interlayer insulating layer 1060 (e.g., passivation) may block an electric connection between a line and remaining elements other than an electrode. The side electrode 1022 may be connected to a metal line 1070. The electro-wetting lens 1002 may pass light within a light transmission width (e.g., OW) corresponding to the space for accommodating the fluid.

The electro-wetting lens 1002 may include a polar liquid 1091 and an apolar liquid 1092 in a space between a plurality of electrodes. The polar liquid 1091 may be, for example, water. The apolar liquid 1092 may be, for example, oil. The electro-wetting lens 1002 may change a gradient of a refractive face by changing a magnitude of a voltage applied to electrodes including the side electrode 1022 and the upper electrode 1021. As illustrated in FIG. 10B, a polar liquid such as water and an apolar liquid such as oil may be contained in a gap between the electro-wetting lenses 1002. The gradient of the refractive face may be changed in accordance with the voltage being applied. The refractive face may be formed as a prism or lens. By applying, to an electrode, one of application (e.g., enable) of a voltage, non-application (e.g., disable) of a voltage, and adjustment of a voltage magnitude, a shape of the refractive face may be changed, and an outgoing light direction may be controlled.

Referring to FIG. 10B, the partition wall structure including an electrode may include the organic partition wall 1030, the electrode, the dielectric material 1040, and the hydrophobic coating 1050. When the structure of the electro-wetting lens 1002 is viewed in a direction of a light entrance portion and a light exit portion, the structure may include the metal line 1070, the interlayer insulating layer 1060, oil, water, the electrode, and the glass substrate 1010.

For reference, in a water-oil system, voltage V and a contact angle θ may be interpreted as a change in contact angle θ according to applied voltage using a Lipmann-Young equation, for example, Equation 8 below.

$$\cos\theta = \cos\theta_0 + \frac{C}{2\gamma}V^2 \qquad \text{[Equation 8]}$$

In Equation 8, V denotes external voltage applied to an electrode, an initial contact angle $\theta_0$ is a contact angle obtained before the external voltage V is applied, the contact angle θ is a contact angle obtained after the external voltage V is applied, C denotes a capacitance per unit area of a dielectric material, and γ denotes a surface tension of a liquid. The surface tension γ may be, for example, an interfacial tension $\gamma_{WO}$ between water and oil. For reference, in FIG. 10B, $\gamma_{SW}$ denotes an interfacial tension between water and the hydrophobic coating 1050 and $\gamma_{SO}$ denotes an interfacial tension between oil and the hydrophobic coating 1050. According to Equation 8, a relationship between the applied voltage V and the contact angle θ corresponding to the gradient of the refractive face may be established. Accordingly, at least one of a thickness and a sagittal value of an active wet lens may be changed based on a voltage applied to a plurality of electrodes.

The refractive face may be formed by an interface between the polar liquid 1091 and the apolar liquid 1092. The interface may be formed as a prism or lens. The electro-wetting lens 1002 may apply (or enable) or not apply (or disable) the voltage to each electrode and control the outgoing light direction of the light by controlling a magnitude of the voltage. The electro-wetting lens 1002 may refract light without polarization, thereby achieving a high optical efficiency. In addition, the electro-wetting lens 1002 may apply a constant driving voltage irrespective of a cell gap, cope with a small-sized sensing element, and be driven at a high speed.

For reference, in FIG. 10B, the dielectric material 1040 is CYTOP(300 Å)+HfO2(2000 Å)+Mo(2000 Å), the polar liquid 1091 is DI Water, NaCl 0.005M, SDS 0.1%, the apolar liquid 1092 is Bromonaphthalene, and a driving voltage is applied as a square wave of 120 Hz at a DC amplitude. However, it is merely an example, and the dielectric material, a type and combination of electrolyte solution as the polar liquid 1091, and a type of oil as the apolar liquid 1092 may be designed in various ways.

Figure 11A:
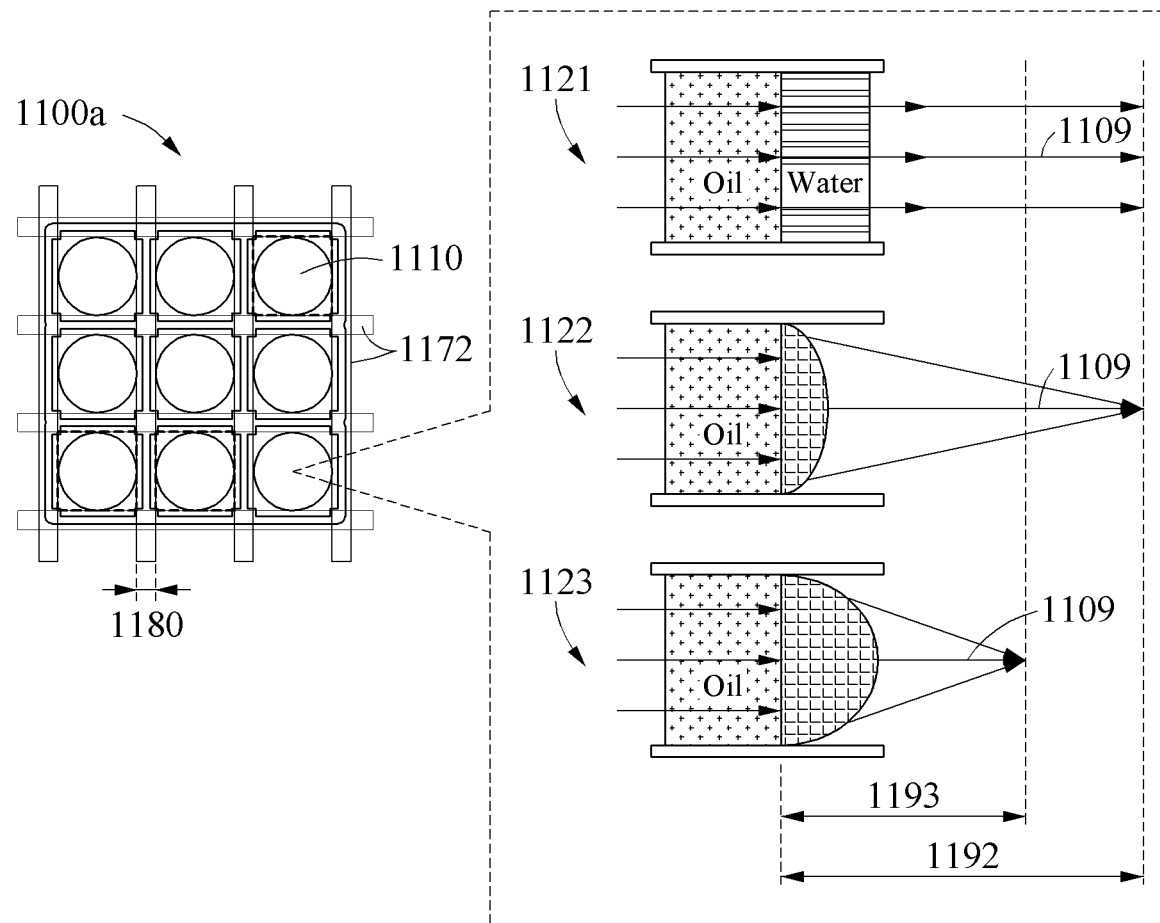
FIGS. 11A and 11B illustrate a wiring structure of an active imaging lens array according to an example embodiment.
Figure 11B:
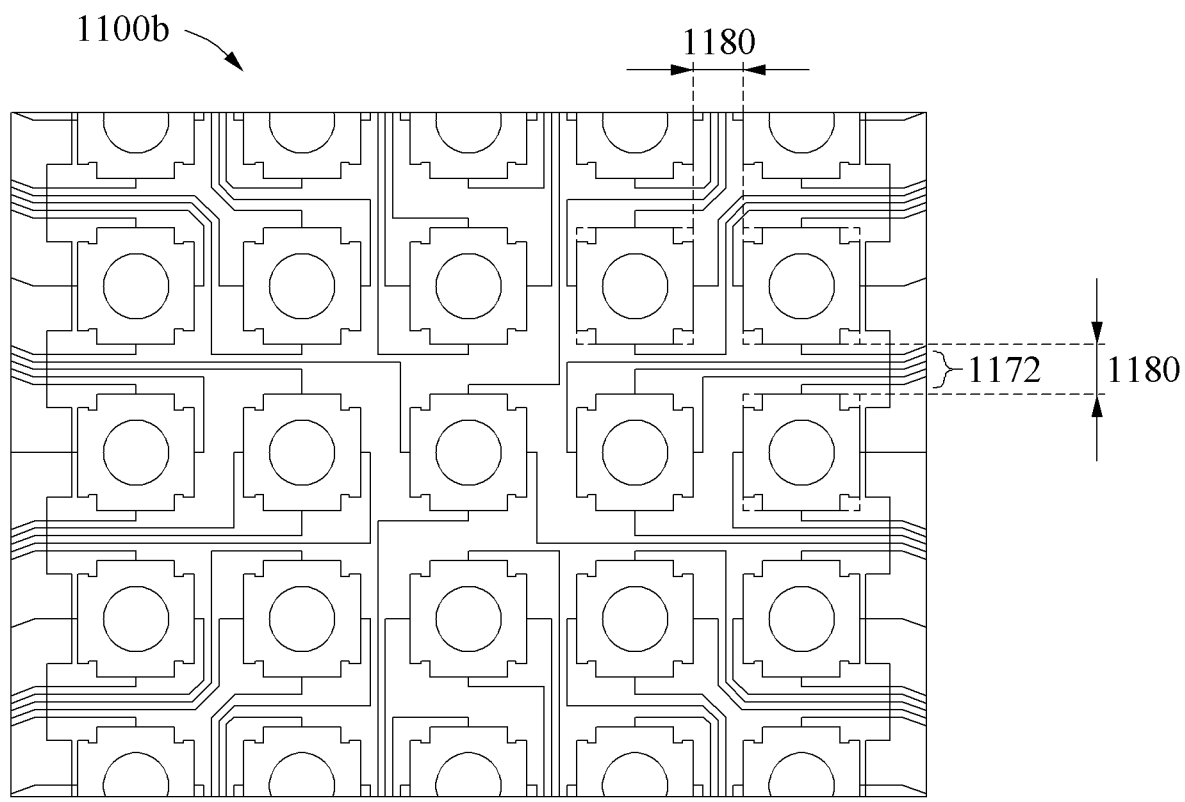

FIGS. 11A and 11B illustrate a wiring structure of an active imaging lens array according to an example embodiment.

As illustrated in FIG. 11A, a gap 1180 may be present between active lens elements 1110 in an active lens array 1100a. The active lens array 1100a may include wires 1172 arranged in the gap 1180. When viewed as an optical axis, light may pass through the active lens element 1110. Thus, wires may not be arranged in a plane area corresponding to the active lens element 1110. Instead, the wires may be arranged in an area therebetween. For example, as shown in a top view 1100b of FIG. 11B, the wires 1172 connected to a plurality of side electrodes included in the active lens element 1110 may be connected to a power source through the gap 1180. The electrodes and the wires 1172 may be configured not to overlap an effective aperture of an imaging optical system.

Based on an applied voltage, the active lens element 1110 may have a planar refractive face 1121 based on an optical axis 1109, a refractive face 1122 having a first focal length 1192, or a refractive face 1123 having a second focal length 1193 smaller than the first focal length 1192. As described above, a focal length of the active lens array 1100a may be adjusted to form an effective focal length corresponding to a selected magnification in response to the selected magnification. At this time, a plurality of active lens elements included in the active lens array 1100a may operate by simultaneously receiving a voltage corresponding to the selected magnification.

Figure 12:
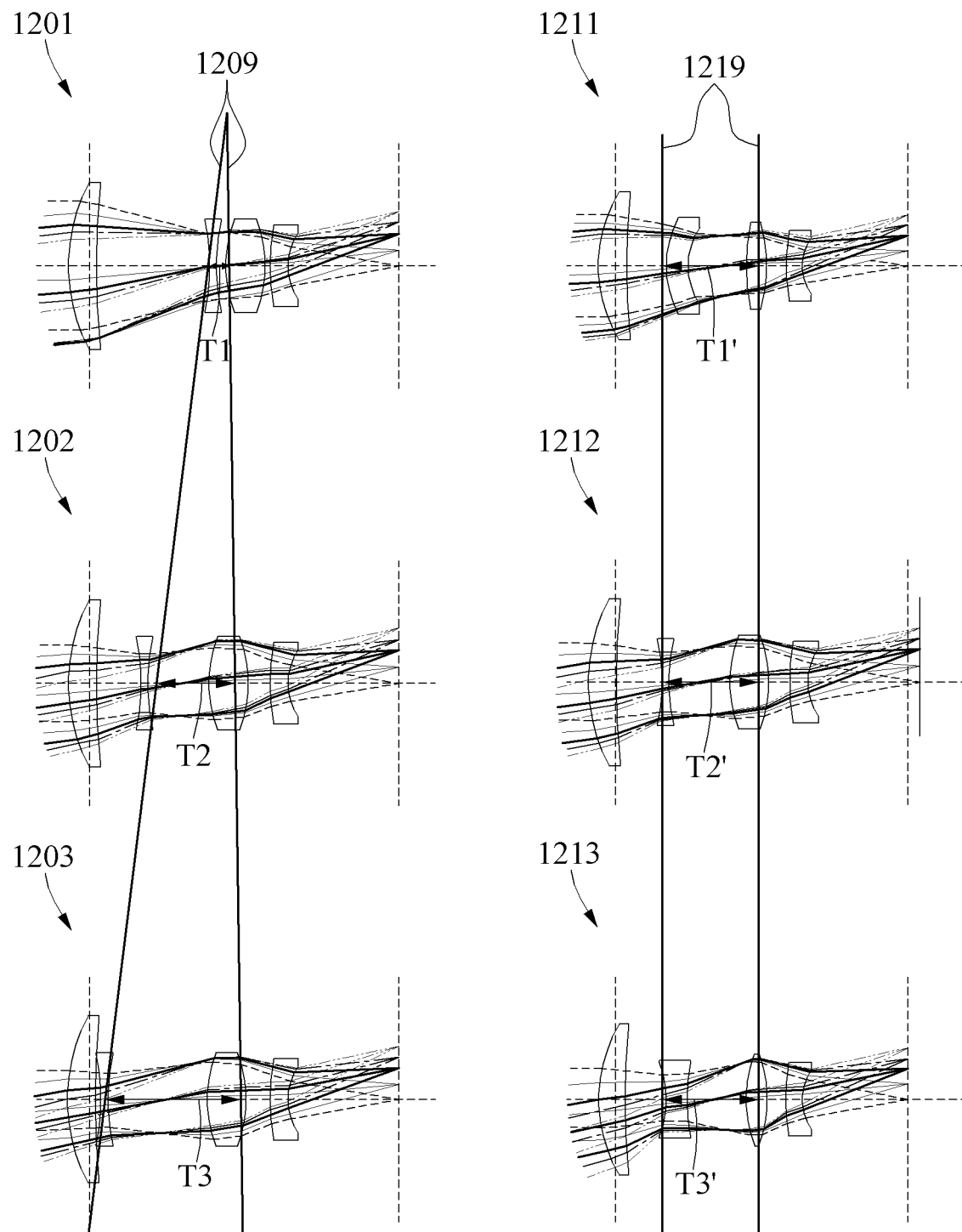
FIG. 12 illustrates ray tracing of a ray passing through multiple layers of an imaging device according to an example embodiment.

FIG. 12 illustrates ray tracing of a ray passing through multiple layers of an imaging device according to an example embodiment.

In optical systems 1201, 1202, and 1203 supporting a variable optical zoom by mechanical driving, a lens spacing 1209 may be adjusted to a distance T1 in a telephoto zoom, a distance T2 in a middle zoom, and a distance T3 in a wide-angle zoom. In contrast, in optical systems 1211, 1212, and 1213 according to example embodiment of the disclosure, a lens spacing 1219 may be fixed to be equal in any zoom while only a focal length of an active lens is changed. As illustrated in FIG. 12, ray tracing results may coincide for both systems. In other words, even without physical movement of the lens, only by changing a refractive force of the active lens, an optical zoom at a level similar to that of the physical movement may be achieved.

Although FIG. 12 illustrates passive lens arrays are arranged at an entrance pupil and an exit pupil in the imaging optical system so as to limit a total track length (TTL) of the optical system, a structure of the optical system is not limited thereto.

Figure 13:
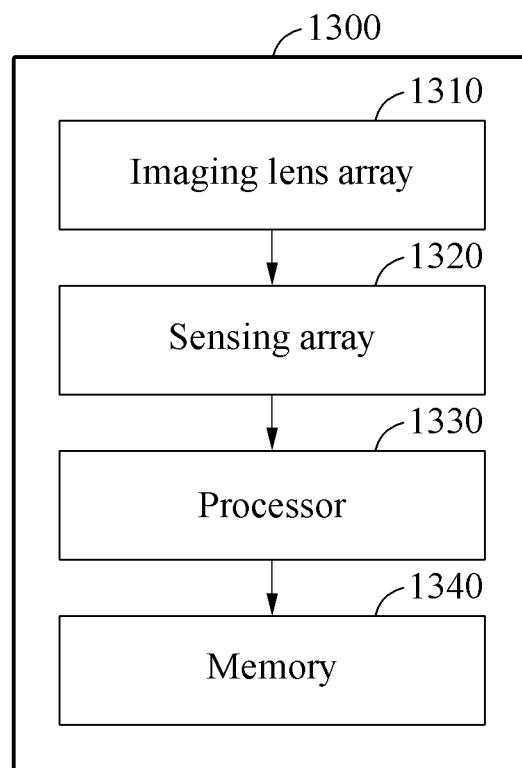
FIG. 13 is a block diagram illustrating a configuration of an imaging device according to an example embodiment.

FIG. 13 is a block diagram illustrating a configuration of an imaging device according to an example embodiment.

An imaging device 1300 may include a lens array 1310 and an image sensor.

The lens array 1310 may include imaging optical lenses transferring light received from outside. As described above, the lens array 1310 may include multiple layers. An optical lens array corresponding to each layer may be an active lens array or a passive lens array. At least one imaging lens array among the plurality of imaging lens arrays may include an active imaging lens having a variable focal length. The image sensor may be a sensor that senses light passing through the lens array 1310. The image sensor may include a sensing array 1320 and a processor 1330.

The processor 1330 may generate an image based on sensing information sensed by sensing elements. The processor 1330 may reconstruct an image corresponding to a magnification selected by a user based on the sensing information sensed in the sensing array. The processor 1330 of the image sensor may also be referred to as, for example, an image signal processor (ISP). The processor 1330 may acquire images of a first resolution corresponding to a plurality of imaging optical lenses based on sensing information sensed by the sensing elements sensing light passing through the plurality of imaging optical lenses in the sensing array 1320, and then reconstruct an image of a second resolution higher than the first resolution from the images of the first resolution. The sensing information may be used not only for image restoration, but also for depth estimation for a subject, refocusing, dynamic range imaging, and capturing a high-sensitivity image in a low-illumination environment.

A memory 1340 may store focal length-related information corresponding to a plurality of pre-defined magnifications for each of the plurality of imaging lens arrays. The processor 1330 may load focal length-related information corresponding to a selected target magnification and adjust a focal length of the active imaging lens based on the loaded focal distance-related information.

Figure 14:
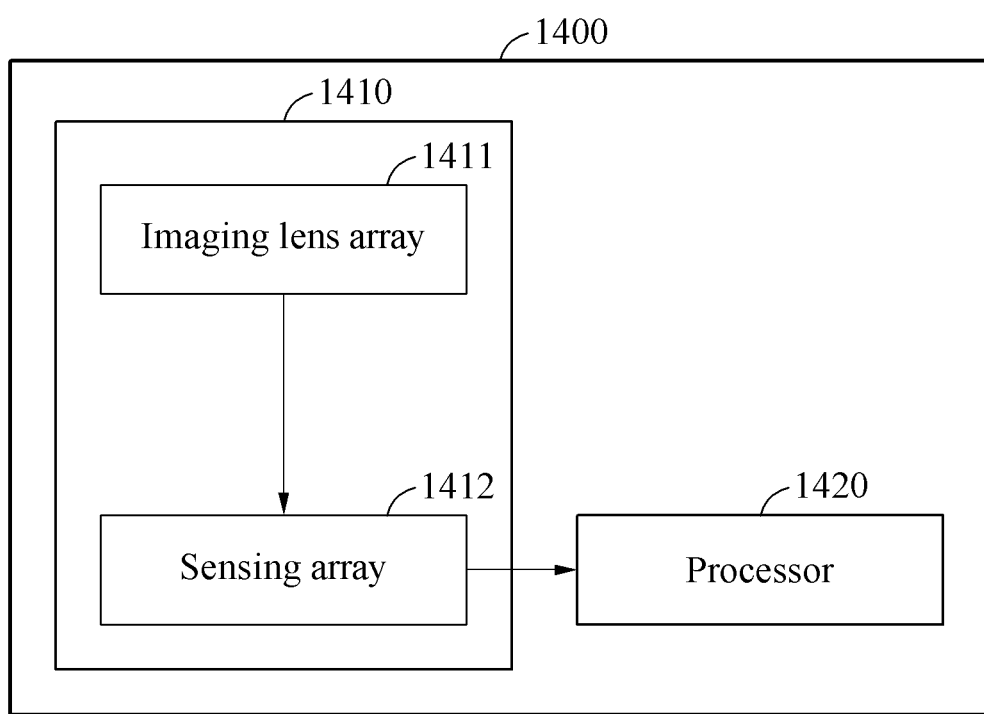
FIG. 14 is a block diagram illustrating a configuration of an electronic terminal according to an example embodiment.

FIG. 14 is a block diagram illustrating a configuration of an electronic terminal according to an example embodiment.

An electronic terminal 1400 may include an imaging module 1410 and a processor 1420.

The imaging module 1410 may include a lens array 1411 and an image sensor. The image sensor may include a sensing array 1412. Unlike the processor 1330 included in the image sensor as shown in FIG. 13, FIG. 14 illustrates that a processor is located independently or separately from the imaging module 1410 according to another example embodiment. The processor 1330 may generate an image corresponding to a target magnification selected by a user based on sensing information sensed in the sensing array. That is, the processor 1330 may reconstruct an image corresponding to a target magnification selected by a user based on sensing information sensed in the sensing array. Since the lens array 1411, the image sensor, and the processor 1420 have been described above, a detailed description will be omitted. The processor 1420 of FIG. 14 may be an application processor (AP).

According to an example embodiment, a memory and/or a storage device may be provided in the electronic terminal 1400. According to an example embodiment, the memory may be a random access memory (RAM) and the processor 1420 may include a central processing unit or a microprocessor, and the like, and may control an overall operation of the electronic terminal 1400. According to an example embodiment, the memory may store one or more instructions, and the processor 1420 may execute the one or more instructions to perform one or more operations. According to an example embodiment, the operations may include controlling the imaging module 1410. The processor 1420 may output instructions to change a focal length of an active lens.

A plurality of imaging lens arrays may include a plurality of imaging optical lenses transferring light received from outside, and may be accommodated in a housing of the electronic terminal. In other words, the plurality of imaging lens arrays may be accommodated in the housing even when a portion protruding from a surface of the electronic terminal to the outside is absent.

According to an example embodiment, an active lens array among the plurality of imaging lens arrays may have a focal length that varies within a range of 0.1 mm to 100 mm by external applied power (e.g., voltage). Thus, a variable refractive power range of the active lens array may range from 10000 to 10 $m^{-1}$. An effective focal length of an imaging optical system formed by the plurality of imaging lens arrays may vary within a range of, for example, 0.1 mm to 100 mm. In addition, when a folding system using a mirror is applied to the aforementioned imaging optical system, a TTL of light including an optical path from an outermost imaging lens to an image sensor may have a value ranging between 0.1 mm and 1000 mm.

Figure 15:
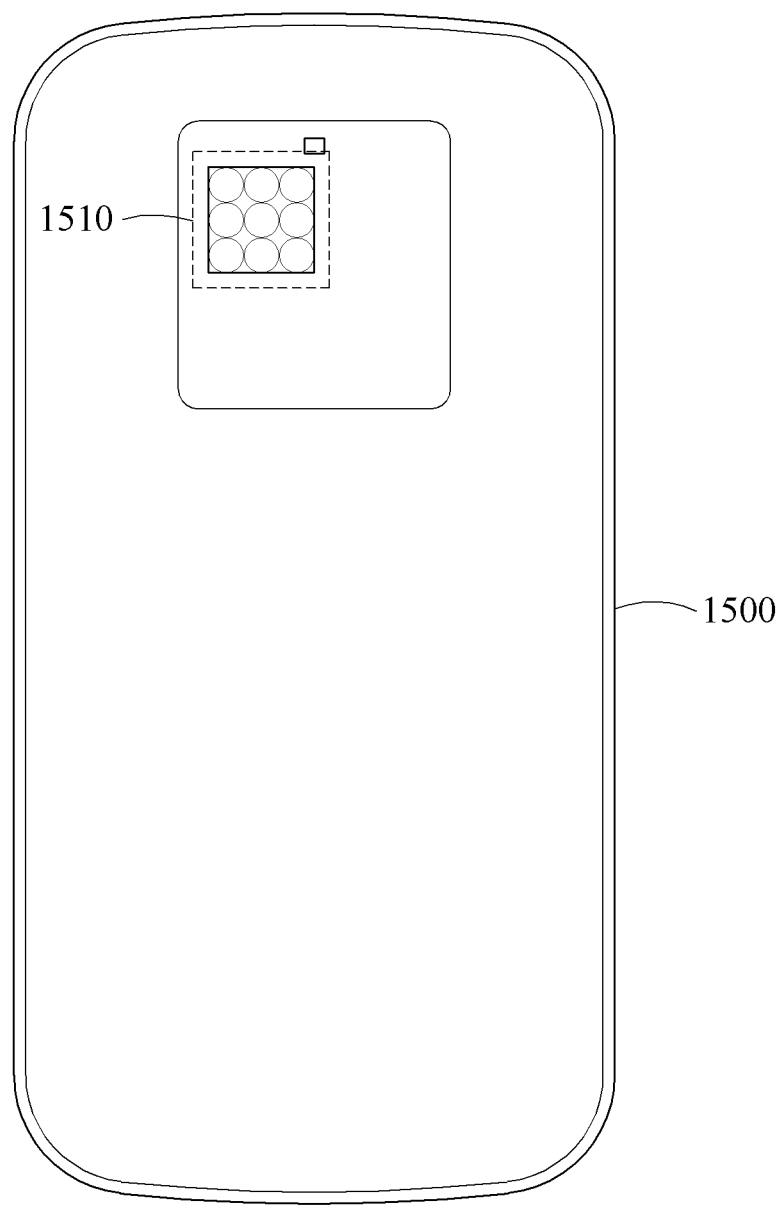
FIGS. 15 and 16 are diagrams illustrating examples of devices in which an image sensor is implemented according to an example embodiment.
Figure 16:
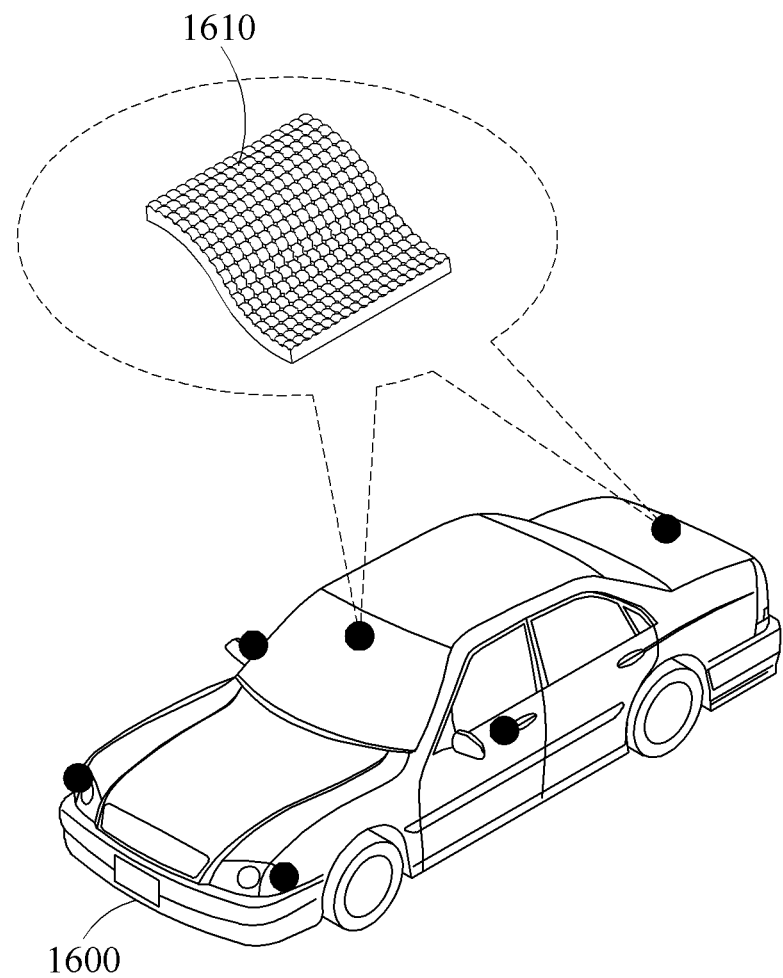

FIGS. 15 and 16 are diagrams illustrating examples of devices in which an image sensor is implemented according to an example embodiment.

An image sensor and/or imaging device may be applied to various technical fields. Since a lens array including a plurality of lenses and a sensor including a plurality of sensing elements may be designed to be separated by a relatively small focal length, the imaging device may be implemented as an ultra-thin camera having a small thickness and a large-sized sensor that enables high-definition photographing.

The image sensor and/or imaging device may be mounted on a mobile terminal. The mobile terminal may be a movable terminal that is not fixed at any location, and may include, for example, a vehicle, an artificial intelligence speaker, and a portable device such as a smartphone, a tablet PC, and a foldable smartphone.

As illustrated in FIG. 15, an imaging module 1510 may be applied to a front camera or a rear camera of a smartphone. The imaging module 1510 may have a structure in which a large-sized full frame sensor is coupled to a multi-lens array, and may be applied to a smartphone camera.

Also, the imaging module 1510 may be implemented in a vehicle in a thin structure or curved structure. As illustrated in FIG. 16, an imaging device 1610 may be implemented in a vehicle 1600 as a front camera or a rear camera having a curved shape. In addition, the imaging device 1610 may be applied to a field such as a DSLR camera, a drone, a CCTV, a camera for webcam, a 360-degree shooting camera, a camera for filming and broadcasting, a VR/AR camera, a flexible/stretchable camera, an insect-eye camera, a contact lens type camera, and the like, for example. Furthermore, the imaging device may also be applied to multi-frame super-resolution image restoration for increasing a resolution using information on a plurality of captured frames.

The example embodiments described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described hardware devices may be configured to act as one or more software modules in order to perform the operations of the above-described example embodiments, or vice versa.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An imaging device comprising:
a plurality of imaging lens arrays comprising a plurality of imaging optical lenses; and
a sensing array comprising a plurality of sensing elements configured to sense light passing through the plurality of imaging lens arrays,
wherein a first imaging lens array and a second imaging lens array among the plurality of imaging lens arrays comprise an active imaging lens with a variable focal length, and a third imaging lens array among the plurality of imaging lens arrays comprises a passive imaging lens with a fixed focal length,
wherein each of the first imaging lens array, the second imaging lens array and the third imaging lens array are spaced apart from the sensing array, wherein each of the first imaging lens array, the second imaging lens array and the third imaging lens array are separated from each other, and
wherein distances between the first imaging lens array, the second imaging lens array and the third imaging lens array on an optical axis are fixed.

2. The imaging device of claim 1, wherein the variable focal length of the active imaging lens is adjustable by changing at least one of a thickness or a sagittal value of the active imaging lens.

3. The imaging device of claim 2, wherein the active imaging lens comprises an active wet lens comprising a polar liquid and an apolar liquid in a space between a plurality of electrodes, and
at least one of the sagittal value or the thickness of the active wet lens is changeable based on a voltage applied to the plurality of electrodes.

4. The imaging device of claim 1, wherein an effective focal length of the plurality of imaging lens arrays is adjustable based on a selected target magnification.

5. The imaging device of claim 1, wherein an effective focal length of the plurality of imaging lens arrays is identified based on focal lengths of imaging optical lenses included in the plurality of imaging lens arrays and distances between the plurality of imaging lens arrays.

6. The imaging device of claim 1, wherein the variable focal length of the active imaging lens is adjustable based on an effective focal length corresponding to a selected target magnification.

7. The imaging device of claim 6, further comprising:
a memory configured to store focal length-related information corresponding to a plurality of previously defined magnifications for each of the plurality of imaging lens arrays,
wherein a focal length of the active imaging lens is adjustable based on the stored focal length-related information.

8. The imaging device of claim 1, wherein all lenses of an imaging lens array, among the plurality of imaging lens arrays, comprising the active imaging lens are deformable to have a same focal length.

9. The imaging device of claim 1, wherein the plurality of imaging lens arrays comprises a first imaging lens array and a second imaging lens array arranged in different planes in an optical axis, and the first imaging lens array comprises a positive lens and the second imaging lens array comprises a negative lens.

10. The imaging device of claim 9, wherein all imaging lenses included in the first imaging lens array are positive lenses, and all imaging lenses included in the second imaging lens array are negative lenses.

11. The imaging device of claim 1, wherein a number of arrays of the plurality of imaging lens arrays is three or more.

12. The imaging device of claim 1, wherein at least one imaging lens array among the plurality of imaging lens arrays comprises a passive imaging lens having a fixed focal length.

13. The imaging device of claim 1, wherein positions of the plurality of imaging lens arrays are fixed in the optical axis.

14. The imaging device of claim 1, wherein a distance between the sensing array and an imaging lens array that is most adjacent to the sensing array among the plurality of imaging lens arrays on an optical axis is fixed.

15. The imaging device of claim 1, comprising:
a processor configured to acquire, based on sensing information sensed by the plurality of sensing elements sensing light passing through each of the plurality of imaging optical lenses in the sensing array, images of a first resolution individually corresponding to the plurality of imaging optical lenses and reconstruct an image of a second resolution higher than the first resolution.

16. The imaging device of claim 1, wherein each of the plurality of imaging optical lenses is configured to focus the light to non-integer sensing elements.

17. An imaging device comprising:
a plurality of imaging lens arrays comprising a plurality of imaging optical lenses; and
a sensing array comprising a plurality of sensing elements configured to sense light passing through the plurality of imaging lens arrays,
wherein at least one imaging lens array among the plurality of imaging lens arrays comprises an active imaging lens with a variable focal length, and
distances between the plurality of imaging lens arrays on an optical axis are fixed,
wherein when a field of view by the plurality of imaging lens arrays exceeds a super-wide threshold angle, a principal plane formed by the plurality of imaging lens arrays is located between the sensing array and an imaging lens array that is most adjacent to the sensing array among the plurality of imaging lens arrays.

18. The imaging device of claim 1, wherein an optical system in which the plurality of imaging lens arrays is combined provides a variable zoom magnification range between 0.5 times and 110 times, inclusive.

19. The imaging device of claim 1, wherein all imaging lenses of an imaging lens array comprising the active imaging lens are active imaging lenses.

20. An electronic terminal comprising:
a plurality of imaging lens arrays provided in a housing of the electronic terminal, each of the plurality of imaging lens arrays comprising a plurality of imaging optical lenses;
a sensing array comprising a plurality of sensing elements configured to sense light passing through the plurality of imaging lens arrays; and
a processor configured to generate an image corresponding to a target magnification based on the sensed light,
wherein a first imaging lens array and a second imaging lens array among the plurality of imaging lens arrays comprise an active imaging lens with a variable focal length, and a third imaging lens array among the plurality of imaging lens arrays comprises a passive imaging lens with a fixed focal length,
wherein each of the first imaging lens array, the second imaging lens array and the third imaging lens array are spaced apart from the sensing array, and
wherein each of the first imaging lens array, the second imaging lens array and the third imaging lens array are separated from each other, and
wherein distances between the first imaging lens array, the second imaging lens array and the third imaging lens array on an optical axis are fixed.

* * * * *